United States Patent
Horan et al.

(10) Patent No.: US 8,280,668 B2
(45) Date of Patent: *Oct. 2, 2012

(54) SELF CALIBRATING CABLE FOR HIGH DEFINITION DIGITAL VIDEO INTERFACE

(75) Inventors: John Martin Horan, Blackrock (IE); John Anthony Keane, Douglas (IE); Gerard David Guthrie, Corofin (IE)

(73) Assignee: Redmere Technology Ltd., Cork (IE)

( * ) Notice: Subject to any disclaimer, the term of this patent is extended or adjusted under 35 U.S.C. 154(b) by 33 days.

This patent is subject to a terminal disclaimer.

(21) Appl. No.: 12/461,031

(22) Filed: Jul. 30, 2009

(65) Prior Publication Data

US 2009/0290026 A1 Nov. 26, 2009

Related U.S. Application Data

(63) Continuation-in-part of application No. 12/219,642, filed on Jul. 25, 2008, now Pat. No. 7,970,567.

(60) Provisional application No. 60/935,080, filed on Jul. 25, 2007.

(51) Int. Cl.
*G06F 19/00* (2011.01)
*H04N 17/00* (2006.01)
(52) U.S. Cl. ........................ 702/107; 348/192
(58) Field of Classification Search .................. 702/107, 702/57, 66, 69, 79, 81, 84–85, 89–90, 108, 702/110, 117, 124–125, 176, 182–183, 188; 348/180–181, 192, E17.001; 327/67, 72–73, 327/362; 333/1, 17.3, 28 R, 32, 100, 124; 725/118, 120, 127, 143, 146–149

See application file for complete search history.

(56) References Cited

U.S. PATENT DOCUMENTS

| | | |
|---|---|---|
| 5,696,951 A | 12/1997 | Miller |
| 6,393,110 B1 | 5/2002 | Price |
| 7,167,090 B1 | 1/2007 | Mandal et al. |
| 7,180,354 B2 | 2/2007 | Gabillard et al. |
| 7,565,530 B2 | 7/2009 | Kwak |
| 7,617,064 B2 | 11/2009 | Stakely et al. |
| 7,680,840 B2 | 3/2010 | Jung |
| 7,706,692 B2 | 4/2010 | Tatum |
| 7,728,223 B2 | 6/2010 | Shintani |
| 7,729,874 B2 | 6/2010 | Keady |
| 7,762,727 B2 | 7/2010 | Aronson |

(Continued)

OTHER PUBLICATIONS

Long Reach™, www.gennum.com/ip/pdffiles/gs8101.pdf, Product description from Gennum Corporation, p. 1-2, 2006.

(Continued)

*Primary Examiner* — Toan M Le

(57) ABSTRACT

A High Definition Multi-Media Interface (HDMI) cable may exhibit frequency dependent signal attenuation, inter symbol interference, and inter-pair skew. A boost device integrated with the cable can compensate for such impairments of the cable. A self calibrating cable with a boost device of the embodiment of the invention is described, in which parameters that control the response of the boost device are set optimally in a self-calibrating process comprising looping the boosted cable on itself through a calibration fixture that contains a calibration control device. The boost device includes pattern generators and a sampling circuit. Each high speed channel of the cable is separately tested and calibrated with the help of one of the other channels serving as a sampling channel. Additional embodiments provide for a selected replica boost device and a distinct pattern generator device in the calibration fixture.

35 Claims, 19 Drawing Sheets

U.S. PATENT DOCUMENTS

| | | | |
|---|---|---|---|
| 7,861,277 | B2 | 12/2010 | Keady |
| 7,873,980 | B2 | 1/2011 | Horan |
| 7,908,634 | B2 | 3/2011 | Keady |
| 7,936,197 | B2 | 5/2011 | Keady |
| 7,970,567 | B2 * | 6/2011 | Horan et al. .......... 702/107 |
| 7,996,584 | B2 | 8/2011 | Keady |
| 8,006,277 | B2 | 8/2011 | Keady |
| 8,058,918 | B2 | 11/2011 | Keady |
| 8,063,504 | B2 | 11/2011 | Chi |
| 8,073,647 | B2 | 12/2011 | Horan |
| 2002/0143485 | A1 | 10/2002 | Chen |
| 2002/0159548 | A1 | 10/2002 | Evans |
| 2004/0081232 | A1 | 4/2004 | Scott |
| 2004/0161070 | A1 | 8/2004 | Yin |
| 2005/0073608 | A1 | 4/2005 | Stone |
| 2005/0132087 | A1 | 6/2005 | Glinski |
| 2006/0239310 | A1 | 10/2006 | Salz |
| 2007/0164802 | A1 | 7/2007 | Rea |
| 2008/0080654 | A1 | 4/2008 | Klowden |
| 2008/0106306 | A1 | 5/2008 | Keady et al. |
| 2008/0106312 | A1 | 5/2008 | Keady |
| 2008/0106314 | A1 | 5/2008 | Keady et al. |
| 2008/0109180 | A1 * | 5/2008 | Keady et al. .......... 702/89 |
| 2008/0151116 | A1 | 6/2008 | Wang et al. |
| 2008/0278122 | A1 | 11/2008 | Chi |
| 2008/0278224 | A1 | 11/2008 | Chi |
| 2009/0030635 | A1 * | 1/2009 | Horan et al. .......... 702/85 |
| 2009/0083825 | A1 | 3/2009 | Miller et al. |
| 2009/0153209 | A1 | 6/2009 | Keady |
| 2010/0013579 | A1 | 1/2010 | Horan |
| 2010/0020179 | A1 * | 1/2010 | Horan et al. .......... 348/181 |
| 2010/0188880 | A1 | 7/2010 | Stakely |
| 2010/0283532 | A1 | 11/2010 | Horan |
| 2010/0301671 | A1 | 12/2010 | Asmanis et al. |
| 2011/0037447 | A1 | 2/2011 | Mair |
| 2011/0238357 | A1 | 9/2011 | Horan |
| 2011/0268451 | A1 | 11/2011 | Groepl et al. |

OTHER PUBLICATIONS

HDMI Super Booster, http://www.gefen.com/pdf/EXT-HDMI-141SB.pdf, the manual for the standalone HDMI "super booster" from Gefen Inc., 2006.

An advertisement for a cable with an integrated HDMI "super booster" from Gefen Inc., http://www.gefen.com/kvm/cables/hdmicables.jsp#hdmisb, 2006.

Favrat et al, "A High-Efficiency CMOS Voltage Doubler", IEEE J. Solid State Circuits, vol. 33, No. 3, pp. 410-416, Mar. 1998.

A. Rezayee and K. Martin "A 10-Gb/s Clock Recovery Circuit with Linear Phase Detector and Coupled Two-stage Ring Oscillator", SSCIRC, Italy, 2002, p. 419-422.

HDMI Specification, www.hdmi.org/manufacturer/specification.asp, version 1.3, Jun. 22, 2006.

TDK Semiconductor Corp.,"78P2341JAT E3/DS3/STS-1 LIU with Jitter Attenuator", http:/datasheet.digchip.com/471/471-391-0-78P2341JAT.pdf Aug. 2003.

Razavi, Behzad "Design of analog CMOS Integrated Circuits", published by McGraw-Hill, New York, 2001.

Sreerama, C., Effects of Skew on EMI for HDMI Connectors and Cables, 2006, International Symposium on Electromagnetic Compatibility, vol. 2, pp. 452-455.

* cited by examiner

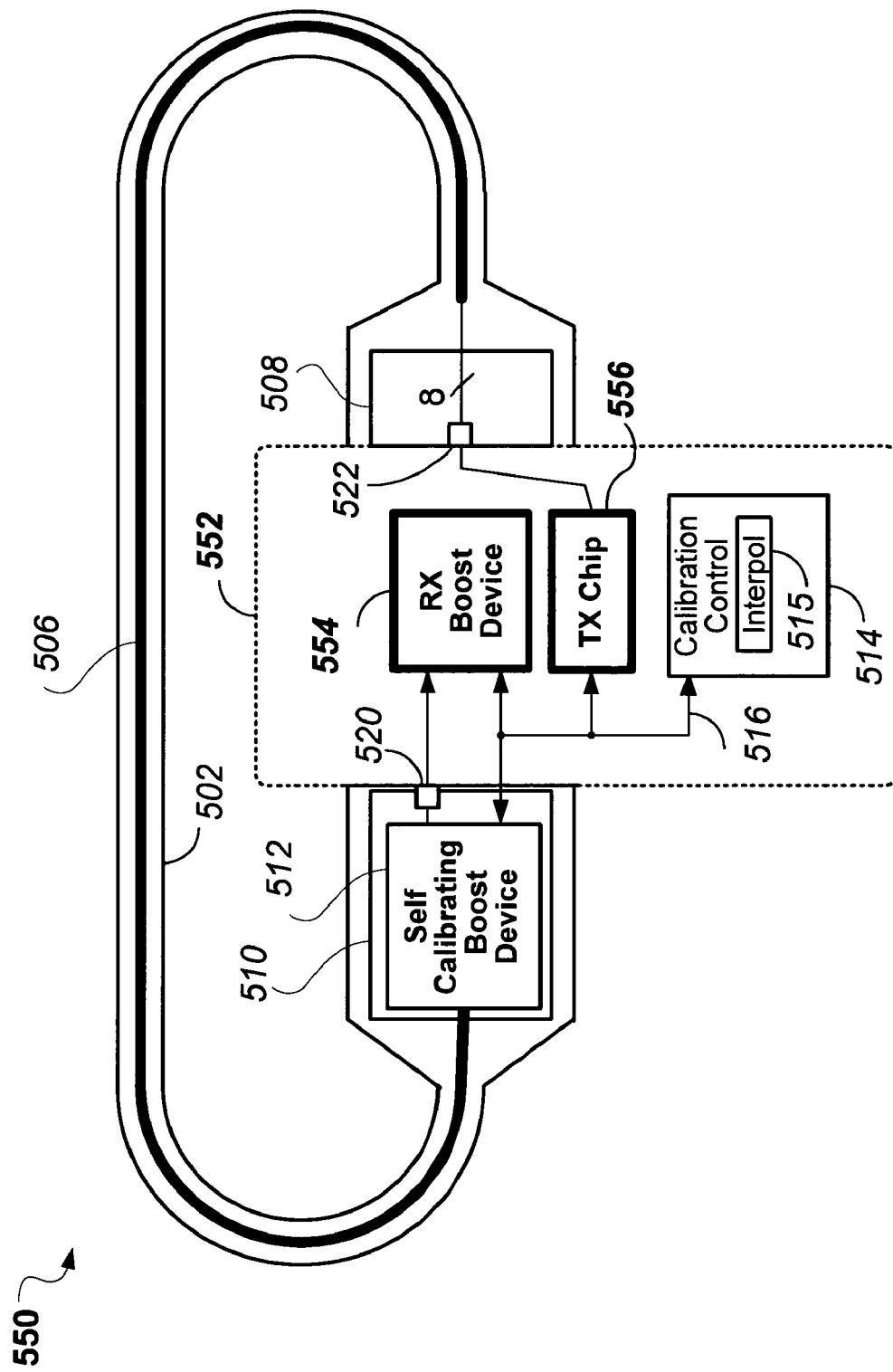

SELF CALIBRATING CABLE FOR HIGH DEFINITION DIGITAL VIDEO INTERFACE

RELATED APPLICATIONS

The present application is a Continuation-in-Part (CIP) of the U.S. application Ser. No. 12/219,642 filed on Jul. 25, 2008 now U.S. Pat. No. 7,970,567 entitled "Self Calibrating Cable For A High Definition Digital Video Interface". The present application claims benefit from the U.S. provisional application Ser. No. 60/935,080 to Horan, John et al. filed on Jul. 25, 2007 entitled "Circuits and Methods for Gigabit Data Recovery and Digital Repeater Implementation", and U.S. application Ser. No. 12/219,642 filed on Jul. 25, 2008 entitled "Self Calibrating Cable For A High Definition Digital Video Interface", both applications being incorporated herein by reference.

FIELD OF THE INVENTION

The present invention relates to high speed cables that carry serially encoded differential signals between electronic equipments, and in particular, multi-conductor cables with embedded boost devices for interconnecting audio-visual equipment.

BACKGROUND OF THE INVENTION

The distribution of television signals has increasingly become based on digital methods and digitally encoded forms of video and audio signals. At the same time, higher resolution (high definition TV) has become available in the market place, commensurate with larger and higher definition displays. To meet the requirement of interconnecting such high definition displays with digital signal sources such as Digital Versatile Disc (DVD) players and receivers/decoders for digital satellite and digital cable distribution of video material, a digital interface standard has evolved, known as the High-Definition Multimedia Interface (HDMI). A detailed specification for HDMI can be obtained from the "hdmi.org" website. The HDMI specification currently available and used in this application is HDMI specification version 1.3 dated Jun. 22, 2006, which is incorporated herein by reference. This HDMI standard can be employed for connecting digital video sources to digital video sinks over a cable that carries a number of digital signals and a clock signal.

The inherent characteristics and manufacturing imperfections of high-speed differential signaling cables such as may be used to carry HDMI signals have an adverse effect on the high-speed signals carried by the cable.

For example, any cable has a limited bandwidth and therefore acts as a low pass filter. The bandwidth of the cable is related to its length, the longer the cable the greater the filtering effect and the lower its bandwidth. As a result, high-frequency signals passing through the cable are attenuated, and their edges become less sharp. This leads to an increased risk of misinterpreting the received data at the receiver end of the cable, especially for long cables and high-speed data.

Accordingly, a more economical calibration method for boosted HDMI cables is required in terms of calibration equipment cost, and time to set up the calibration process.

SUMMARY OF THE INVENTION

Therefore there is an object of the present invention to provide a system for calibrating a high speed cable carrying a plurality of high speed channels and a low speed control bus, which would avoid or mitigate the disadvantages of the prior art.

According to one aspect of the invention, there is provided a system for calibrating a high speed cable carrying a plurality of high speed channels, the cable having a low speed control bus, an input connector, an output connector, and a boost device having programmable parameters for boosting the high speed channels, the system comprising:
  a calibration fixture including:
    a plurality of programmable boost circuits coupled to the output connector for receiving boosted high speed channels from the boost device;
    a corresponding plurality of transmit circuits for transmitting a test signal to the high speed channels at the input connector; and
    a calibration control device, operably connected to the low speed control bus, for calibrating the cable by setting the programmable parameters of the boost device.

Preferably, the pluralities of programmable boost circuits and of transmit circuits are included in a selected boost device.

The selected boost device comprises:
  a pattern generator interfacing the low speed control bus, for generating the test signal; and
  the plurality of transmit circuits.

The selected boost device further comprises:
  a sampling circuit for sampling outputs of the programmable boost circuits; and
  a sampling control circuit for monitoring the sampling circuit and for sending sampling results to the calibration control device.

In the system described above, said another boost device is a selected boost device having been selected from manufactured boot devices and screened for high accuracy of its sampling circuit.

The sampling circuit comprises:
  a programmable delay for delaying an output of a first selected one of the programmable boost circuits;
  a sampling circuit element for generating samples from an output of a second selected one of the programmable boost circuits clocked with the delayed output of the first selected one, wherein the samples have values of "0" and "1"; and
  a means for determining an average of the values of N generated samples.

Conveniently, said sampling circuit element comprises a flip flop, and said means for determining the average comprises a counter for counting instances of the generated samples having the same value.

The sampling control circuit comprises:
  a delay step counter for varying the a programmable delay in predetermined delay steps;
  a memory for storing the average of N generated samples for each delay step;
  a divide-by-N counter for incrementing the delay step counter to the next step after N samples have been collected.

Additionally, the calibration control device comprises means for interpolating between the predetermined delay steps by using the averages stored in said memory.

In the system of the embodiment of the invention, the means for transmitter is a transmit chip, which comprises a pattern generator interfacing the low speed control bus, for generating the test signal.

According to another aspect of the invention, there is provided a method for calibrating a high speed cable having a boost device, the cable carrying a plurality of high speed channels and a low speed control bus, the cable including an input connector and an output connector, the method comprising:

(a) propagating the high speed channels from the output connector to the input connector;

(b) selecting a test channel from among the high speed channels;

(c) selecting a sampling channel from among the remaining high speed channels;

(d) calibrating the test channel; and (e) repeating the steps (b) to (d) until all high speed channels are calibrated.

In the method described above, the step (d) comprises:

(f) selecting and setting a parameter set of the boost device;

(g) testing the test channel with the selected parameter set to obtain a measure that is indicative of the performance of the boost device;

(h) selecting a different parameter set; and (i) repeating the steps (g) and (h) until a required measure is obtained.

Preferably, the measure is a pulse width error, and the required measure is a minimized pulse width error.

The step (a) of the method comprises propagating the high speed channels through a direct feed-through connection.

In the method described above, the step (g) comprises:

(j) sending a repetitive test pattern including a transmitted pulse over the test channel; and (k) sending a repetitive sampling pattern synchronized with the repetitive test pattern over the sampling channel.

The step (g) further comprises:

(l) receiving a received test pattern and a received sampling pattern through the looped cable from the test channel and the sampling channel respectively; and (m) sampling the received test pattern with the received sampling pattern to obtain relative times of rising and falling edges of a received pulse of the received test pattern.

The step (g) further comprises:

(n) computing a pulse width of the received pulse from the difference of the relative times; and (o) computing the pulse width error as the absolute difference between the pulse widths of the transmitted pulse and the received pulse.

The step (m) comprises:

(p) delaying the received sampling pattern by a programmable delay value to obtain a delayed sampling pulse;

(q) sampling the received test pattern with the delayed sampling pulse N times to yield "0" and "1" samples;

(r) counting the samples, which have the same value, to produce a count;

(s) saving the count and the delay value in a memory;

(t) repeating the steps (p) to (s) for different delay values;

(u) computing the relative times of rising and falling edges from the saved delay values and the saved counts.

Beneficially, N is greater than 8.

According to another embodiment of the invention, there is provided a method for calibrating a high speed cable having a boost device, wherein the step (a) comprises (a1) receiving a boosted signal of the high speed channels from the output connector in another boost device; and (a2) transmitting a test signal of the high speed channels to the input connector from the another boost device.

In the method of the another embodiment of the invention, the step (g) comprises:

(j1) sending a repetitive test pattern including a transmitted pulse from the another boost device over the test channel; and (k1) sending a repetitive sampling pattern synchronized with the repetitive test pattern from the another boost device over the sampling channel.

The step (g) further comprises:

(l1) receiving in the boost device a received test pattern and a received sampling pattern through the looped cable from the test channel and the sampling channel respectively;

(l2) boosting the received test pattern and the received sampling pattern in the boost device and forwarding a boosted test pattern and a boosted sampling pattern to the another boost device; and (m1) sampling the boosted test pattern in the another boost device with the boosted sampling pattern to obtain relative times of rising and falling edges of a boosted pulse of the boosted test pattern.

The step (g) further comprises:

(n1) computing a pulse width of the boosted pulse from the difference of the relative times; and (o1) computing the pulse width error as the absolute difference between the pulse widths of the transmitted pulse and the boosted pulse.

The step (m1) comprises:

(p1) delaying the boosted sampling pattern by a programmable delay value to obtain a delayed sampling pulse;

(q1) sampling the boosted test pattern with the delayed sampling pulse N times to yield "0" and "1" samples;

(r1) counting the samples, which have the same value, to produce a count;

(s1) saving the count and the delay value in a memory;

(t1) repeating the steps (p) to (s) for different delay values;

(u1) computing the relative times of rising and falling edges from the saved delay values and the saved counts.

Preferably, N is greater than 8.

According to yet another embodiment of the invention, there is provided a method for calibrating a high speed cable having a boost device, wherein the step (a) comprises (a3) receiving a boosted signal of the high speed channels from the output connector in another boost device; and (a4) transmitting a test signal of the high speed channels to the input connector from a transmit chip.

In said yet another embodiment of the invention, the step (g) comprises:

(j2) sending a repetitive test pattern including a transmitted pulse from the transmit chip over the test channel; and (k2) sending a repetitive sampling pattern synchronized with the repetitive test pattern from the transmit chip over the sampling channel.

The step (g) further comprises:

(l3) receiving in the boost device a received test pattern and a received sampling pattern through the looped cable from the test channel and the sampling channel respectively;

(l4) boosting the received test pattern and the received sampling pattern in the boost device and forwarding a boosted test pattern and a boosted sampling pattern to the another boost device; and (m2) sampling the boosted test pattern in the another boost device with the boosted sampling pattern to obtain relative times of rising and falling edges of a boosted pulse of the boosted test pattern.

The step (g) further comprises:

(n2) computing a pulse width of the boosted pulse from the difference of the relative times; and (o2) computing the pulse width error as the absolute difference between the pulse widths of the transmitted pulse and the boosted pulse.

The step (m2) comprises:
(p2) delaying the boosted sampling pattern by a programmable delay value to obtain a delayed sampling pulse;
(q2) sampling the boosted test pattern with the delayed sampling pulse N times to yield "0" and "1" samples;
(r2) counting the samples, which have the same value, to produce a count;
(s2) saving the count and the delay value in a memory;
(t2) repeating the steps (p) to (s) for different delay values;
(u2) computing the relative times of rising and falling edges from the saved delay values and the saved counts.

Preferably, N is greater than 8.

Thus, improved system and method for calibrating a high speed cable have been provided.

BRIEF DESCRIPTION OF THE DRAWINGS

Embodiments of the invention will now be described, by way of example, with reference to the accompanying drawings in which:

FIG. 7C shows a further alternative calibration setup 550 according to a third embodiment of the invention, comprising the self calibrating HDMI cable 502 of FIG. 7A and an expanded Calibration Fixture 552;

DETAILED DESCRIPTION OF THE EMBODIMENTS OF THE INVENTION

Figure 1:
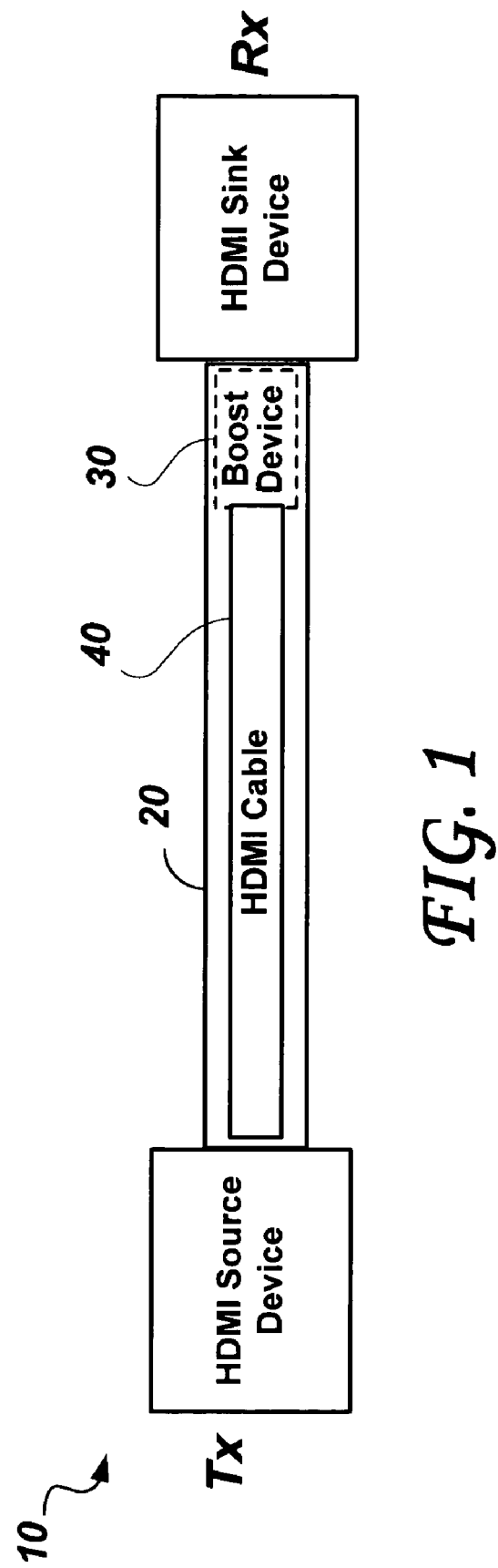
FIG. 1 shows an the HDMI system 10 including an improved HDMI cable 20.

FIG. 1 shows an HDMI system 10 including an improved HDMI cable 20. The HDMI system 10 includes an HDMI transmitter Tx (HDMI Source Device), an HDMI receiver Rx (HDMI Sink Device), and the improved HDMI cable 20 connecting the Tx to the Rx.

The improved HDMI cable 20 comprises an embedded boost device 30 and a basic (passive) HDMI cable 40. The boost device 30 is located near the end of the improved HDMI cable 20 closest to the HDMI receiver Rx. The improved HDMI cable 20 may be used to connect a DVD player to a Television Screen for example, or in general connect any HDMI Source Device to an HDMI Sink Device.

Figure 2:
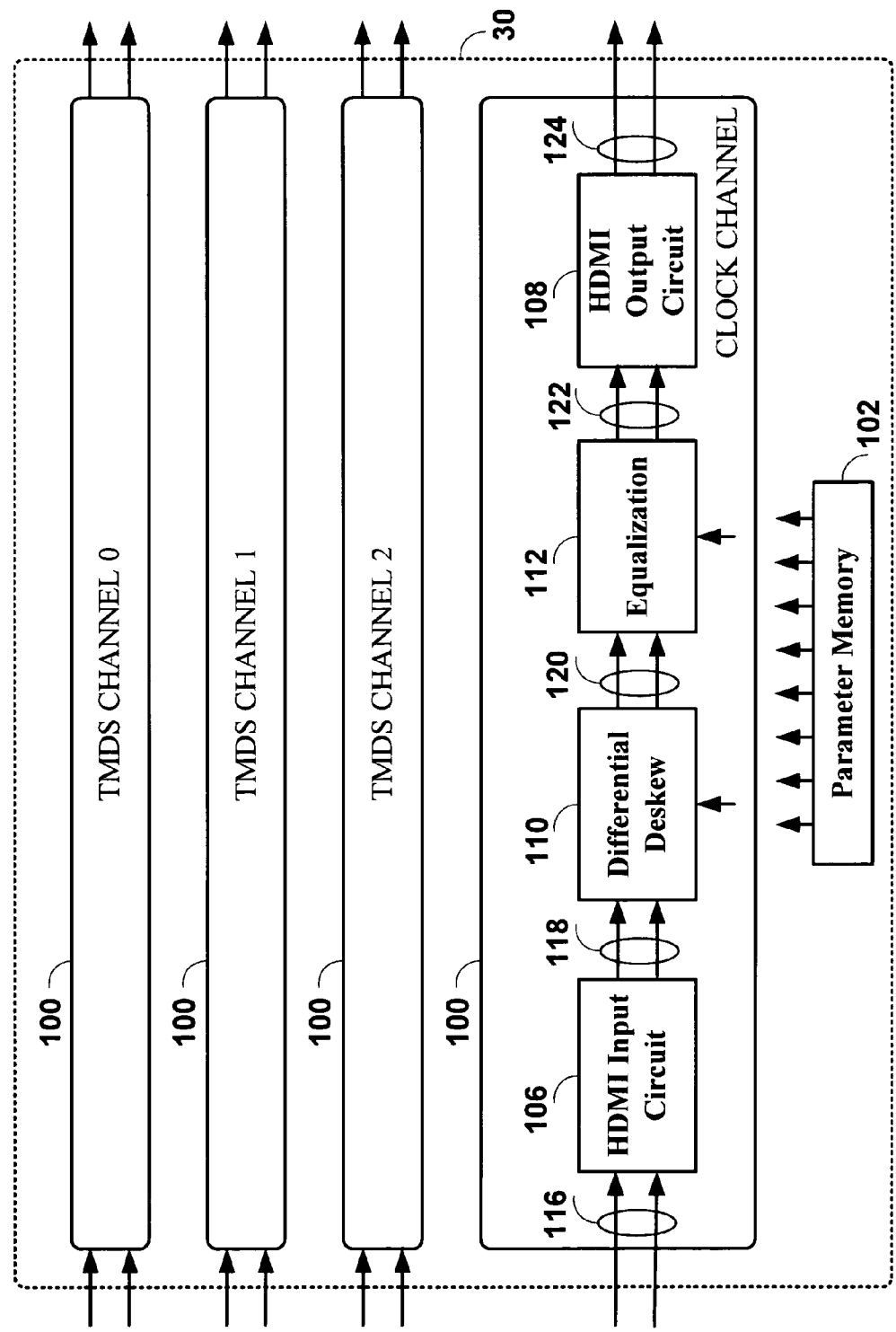
FIG. 2 shows a block diagram of circuits that are included in the boost device 30 of the HDMI system 10 of FIG. 1.

FIG. 2 shows a block diagram of circuits that are included in the boost device 30 of the HDMI system 10 of FIG. 1. The boost device 30 includes a number of channel boost circuits 100, and a parameter memory 102. Typically, the boost device 30 includes four (4) channel boost circuits 100, each to boost the signal of one of the TMDS Channel 0, the TMDS Channel 1, the TMDS Channel 2, and the Clock Channel. These four channels are high speed digital channels as described in the HDMI specification.

Each channel boost circuit 100 includes an HDMI Input Circuit 106 and an HDMI Output Circuit 108. Each channel boost circuit 100 may further include a Differential (intra-pair) Deskew Circuit 110 for adjusting an existing time skew of the two polarities of a differential data signal propagating through the basic HDMI cable 40 and an Equalizer Circuit 112 to compensate for the limited bandwidth characteristics of the basic HDMI cable 40. Each channel boost circuit thus provides a transfer function from the respective HDMI Input to the corresponding HDMI Output with characteristics designed to compensate for the degradation of the corresponding differential pair in basic cable 40.

The improved HDMI cable 20 comprising four boost circuits may be manufactured with any of a number of different lengths of the basic (passive) HDMI cable 40. To compensate for the differential skew and the frequency response of each individual cable, methods have been proposed in a patent application Ser. No. 11/826,712 "System And Method For Calibrating A High-Speed Cable", which is incorporated herein by reference, for calibrating the Differential Deskew Circuit 110 and the Equalizer Circuit 112 through digital parameters stored in the parameter memory 102. The Parameter Memory 102 may be loaded with parameter values at the time of manufacture of the improved HDMI cable 20. Other patent applications of the same assignee, all of which are incorporated herein by reference, Ser. No. 11/826,713 "A High-Speed Cable With Embedded Power Control', Ser. No. 11/826,716 "A Programmable High-Speed Cable With Boost Device", Ser. No. 11/826,710 "A Programmable High-Speed Cable With Printed Circuit Board And Boost Device", Ser. No. 11/826,711 "A Programmable Cable With Deskew And Performance Analysis Circuits", all of which were filed on Jul. 18, 2008, have described an HDMI cable that includes a boost device.

Three alternative methods have been proposed for calibrating the parameters: a Real Time Calibration method; a Frequency Domain Calibration method; and a Time Domain Calibration method. Because the physical cable is fairly stable, it is not necessary to dynamically adjust these parameters in the field, once they have been set originally, although the Real Time Calibration method could certainly be adapted to perform this.

The Frequency Domain and Time Domain Calibration methods require expensive external test equipment while the Real Time Calibration method additionally relies on an external HDMI data generator and a sophisticated performance analysis circuit built into the boost device 30.

Figure 3:
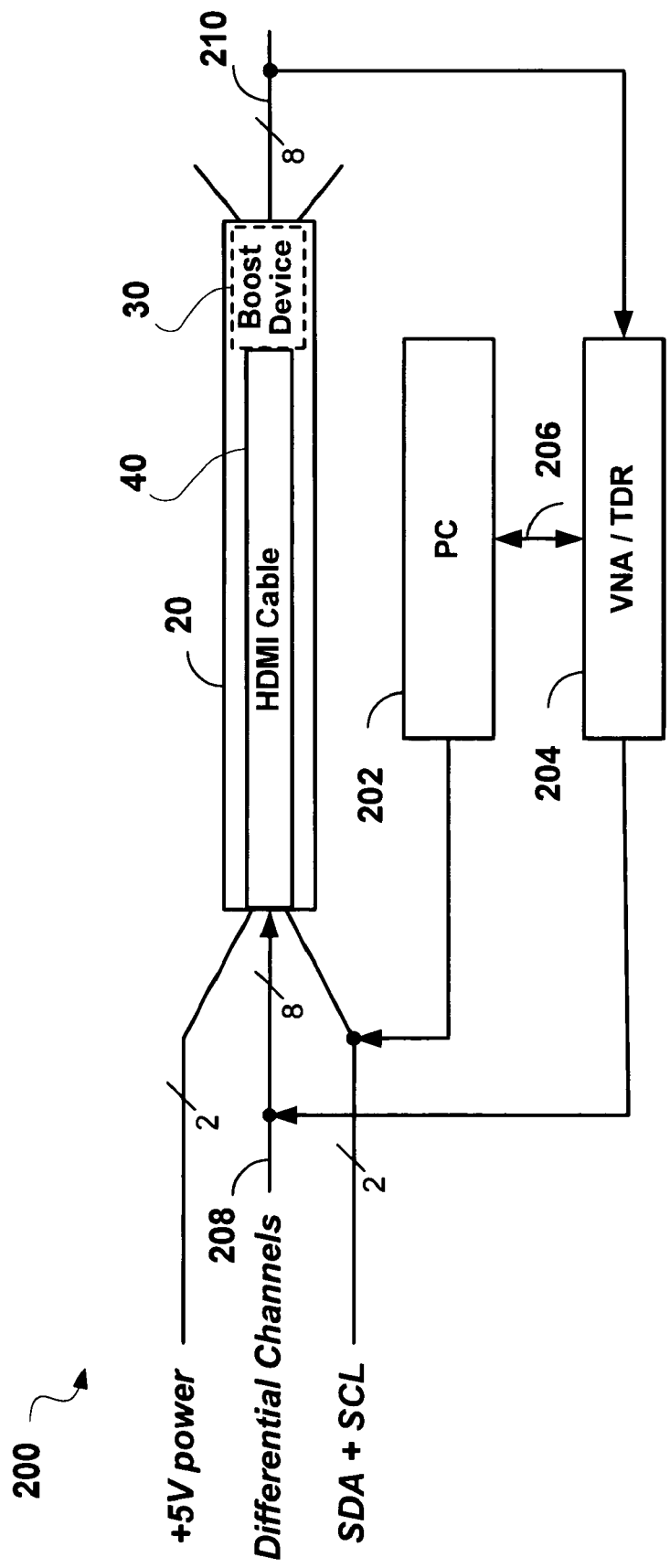
FIG. 3 shows a generic test set up 200 for Frequency Domain and Time Domain Calibration methods.

FIG. 3 shows a generic test set up 200 for Frequency Domain and Time Domain Calibration methods. The generic test set up 200 includes the improved HDMI Cable 20 (see FIG. 1), a PC 202, and test equipment 204 that is either a VNA (Vector Network Analyzer) or a TDR (Time Domain Reflectometer). The PC 202 is attached to the control bus (SDA+SCL) of the basic HDMI Cable 40. The test equipment 204 is connected to the differential channels at both ends of the cable, that is the four differential channel inputs (8 wires) 208 and the four differential channel outputs (8 wires) 210 that are carrying the boosted signal.

The test equipment 204 is controlled by the PC 202 over a standard PC-interface 206 to send stimulus signals into the cable inputs (208) and to receive measurement results from the cable outputs (210). The results are passed back to the PC 202 over the standard PC-interface 206 for evaluation.

It is possible with the test equipment 204 being either a VNA or a TDR to obtain both frequency attenuation and delay characteristics of the cable, although well-known mathematical transformations are required to convert between the frequency and time domain results obtained with the VNA or the TDR respectively.

Figure 4:
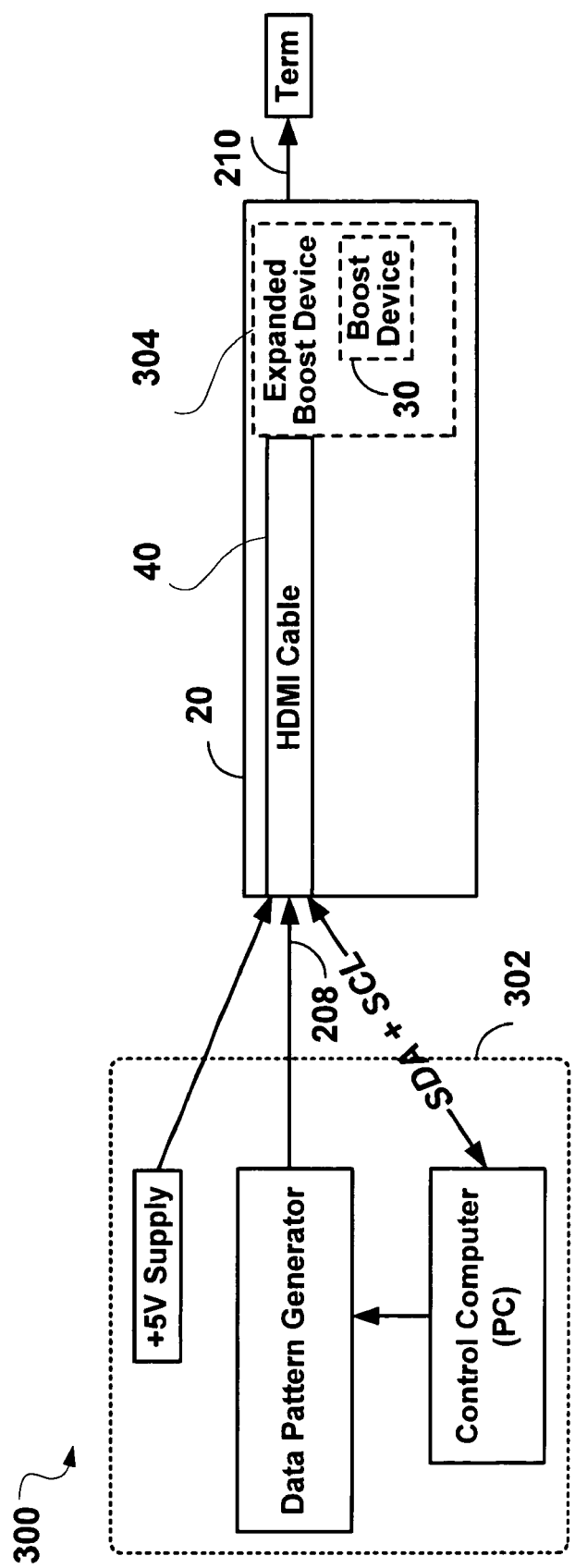
FIG. 4 shows a Real Time Configuration 300 used in a Real Time Cable Calibration method.

FIG. 4 shows a Real Time Configuration 300 used in a Real Time Cable Calibration method. The Real Time Configuration 300 includes a Real Time Test Equipment 302 and the improved HDMI cable 20 of FIG. 1, which however includes an expanded boost device 304. The expanded boost device 304 includes the boost device 30 (FIG. 2) and additional circuitry for analyzing the boosted signal (210) and providing access to the control bus (SDA+SCL).

The Real Time Test Equipment 302 includes a +5V Supply to supply power to the cable; a Data Pattern Generator for generating HDMI-conforming differential data and clock signals to feed into the differential channel inputs (208), and a Control Computer (PC) to control the data patterns to be output by the Data Pattern Generator, and to communicate with the expanded boost device 304 in the cable over the control bus (SDA+SDL). A termination device "Term" that comprises a set of typical differential termination circuits is connected to the differential channel outputs 210.

To calibrate the cable (each cable is individually calibrated at production) the Real Time Calibration method may include the following steps:

a control program in the PC instructs the Data Pattern Generator to send HDMI data patterns into the differential channel inputs 208 of the cable;

the control program in the PC uses the control bus (SDA+SDL) to send deskew and equalization parameters to the expanded boost device 304;

the expanded boost device 304 performs the deskew and equalization steps as determined by the set parameters;

the expanded boost device 304 analyzes the quality of the deskewed and equalized signal;

the expanded boost device 304 reports the quality result to the PC over the control bus (SDA+SDL);

the preceding steps are repeated for each differential channel and with different parameters;

the best settings are determined and permanently set into the parameter memory 102 within the boost device 30.

Figure 5:
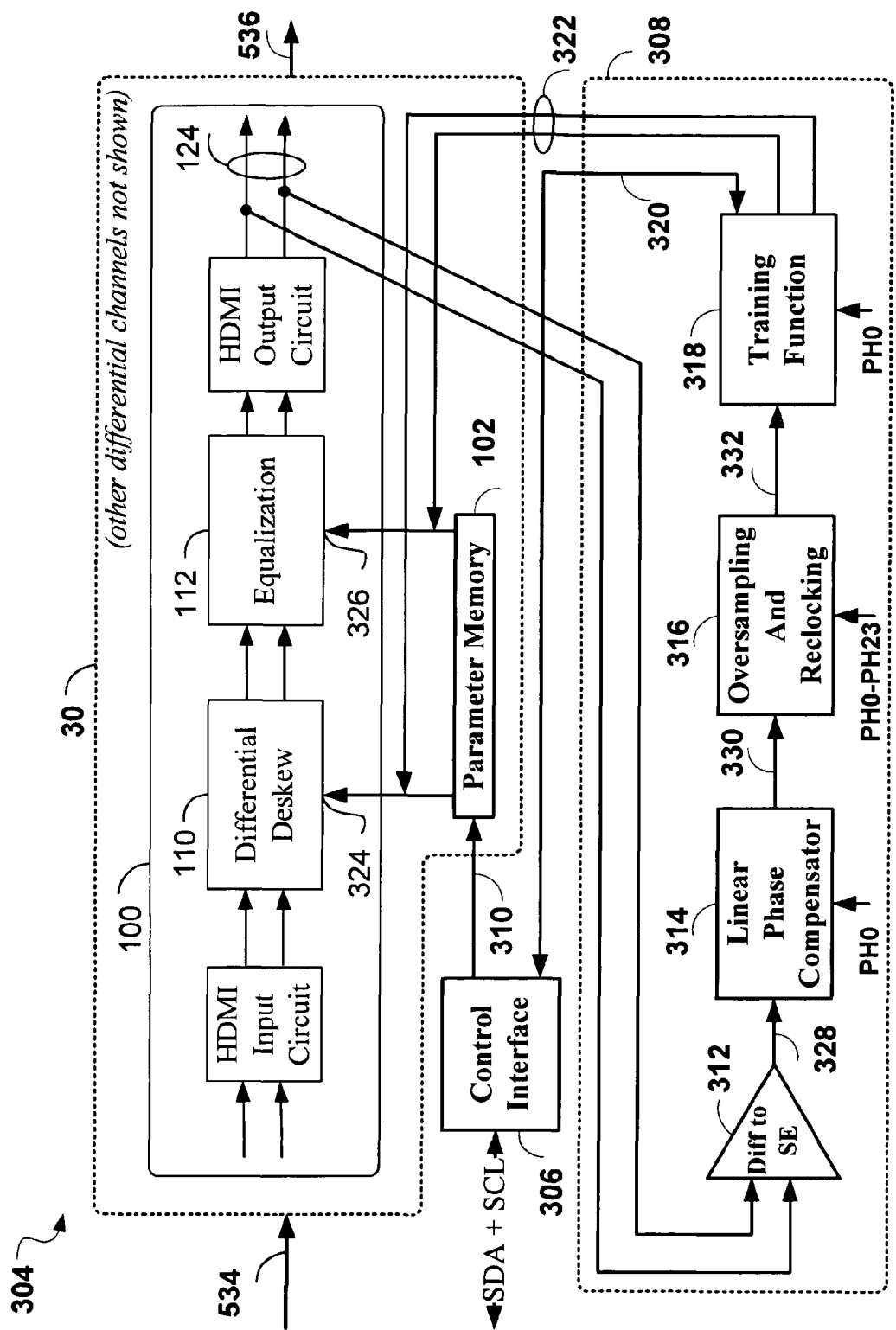
FIG. 5 shows a simplified block diagram of the expanded boost device 304 of FIG. 4.

FIG. 5 shows a simplified block diagram of the expanded boost device 304, including the boost device 30, a Control Interface 306, and a performance analysis circuit 308. Only a representative one of the four channel boost circuits 100 is shown in the FIG. 5, it being understood that each of the three differential TMDS channels and the differential clock channel are processed by a respective channel boost circuits 100.

The Control Interface 306 communicates with the Real Time Test Equipment 302 of FIG. 4 over the control bus SDA+SCL, and with the parameter memory 102 (in the boost device 30) over a parameter setup link 310.

The performance analysis circuit 308 is only active (powered up under control of the Control Interface 306) when the expanded boost device 304 is being calibrated.

The performance analysis circuit 308 includes a Differential-to-Single-Ended block 312, a Linear Phase Compensator 314, an Oversampling and Reclocking block 316, and a Training Function block 318. An output of the Training Function block 318 is connected to an input of the Control Interface 306 over a control link 320. Two optional outputs (parameter links 322) of the Training Function block 318 are connected to deskew and equalization parameter inputs 324 and 326 of the channel boost circuit 100, bypassing the Parameter Memory 102.

Not shown in FIG. 5 is a conventional clock recovery circuit which recovers the clock from any of the differential channels, and generates a multiphase clock signal (clock phases PH0 to PH23). The generation of the multiphase clock signal may be accomplished with a phase locked loop using any of a number of known techniques to generate multiple phases of a clock.

When each of the four channel boost circuits 100 is to be calibrated by the Real Time Cable Calibration method, its "boosted signal" pair 124 is tapped and connected to the performance analysis circuit 308.

Note that a single common performance analysis circuit 308 may be shared for calibrating the four channel boost circuits 100 sequentially. Alternatively, a plurality of performance analysis circuits 308 may be included in the expanded boost device 304 which would allow the channel boost circuits 100 to be calibrated in parallel.

In the performance analysis circuit 308 the "boosted signal" pair 124 is connected to the Differential-to-Single-Ended block 312 which converts the boosted signal 124 into a single-ended signal 328 that is input to the Linear Phase Compensator 314 which also receives the PH0 phase of the multiphase clock signal, and produces as output a phase aligned signal 330.

The Oversampling and Reclocking block 316 receives the phase aligned signal 330 as well as all 24 phases (PH0 to PH23) of the multiphase clock signal, to generate a 24-sample digital samples signal 332 which is then input to the Training Function block 318.

After being converted to the single-ended signal 328 in the Differential-to-Single-Ended block 312, the data is ready to be sampled (converted into a digital signal). To define the phase relationship between the on-board clock (PH0 of the multi-phase clock) and the data (the single ended signal 328), an Analog Phase detector (within the Linear Phase Compensator 314) is used. The frequency of the data and the recovered clock are equivalent because the timings in both are derived from the same source, that is, the transmitted clock, so there is no need for frequency adjustment. The Linear Phase Compensator 314 may be based on a scheme described in the paper entitled "A 10-Gb/s Clock Recovery Circuit with Linear Phase Detector and Coupled Two-stage Ring Oscillator" by Afshin Rezayee and Ken Martin. This paper, which is incorporated herein by reference, was published at the European Solid State Circuits Conference (SSCIRC) in Florence, Italy in the year 2002, pp. 419-422.

The phase aligned (data) signal 330 is a rail-to-rail analog signal that may still contain Inter Symbol Interference (ISI), distortion, noise, and other impairments. In the Oversampling and Reclocking block 316, this signal is effectively sampled at a rate 12 times the clock rate of the signal, i.e. during each bit period the data signal is sampled at 12 evenly spaced intervals, to generate 12 digital samples. Because of the high speed of the signal (typically 1.65 Gbs) it is not practical to actually sample the signal with a 12-times higher clock signal. Instead, the same effect is achieved by sampling the signal with 12 evenly spaced phases of the clock signal, each clock phase generating a digital sample, thus 12 samples representing one data bit. As described in the above cited patent application Ser. Nos. 11/826,713 and 11/826,716, 24 clock phases (PH0 to PH23 of the multiphase clock signal) are used to capture not only one data bit in 12 sampling phases, but also the trailing half of the previous data bit in 6 sampling phases and the leading half of the next data bit in another 6 sampling phases. Conventional digital register logic and pipelining is used to thus look into the "future".

Thus, the Oversampling and Reclocking block 316 generates 24 samples (a "24-sample word") at the bit-clock rate, by outputting the 24-sample digital samples signal 332.

Figure 6:
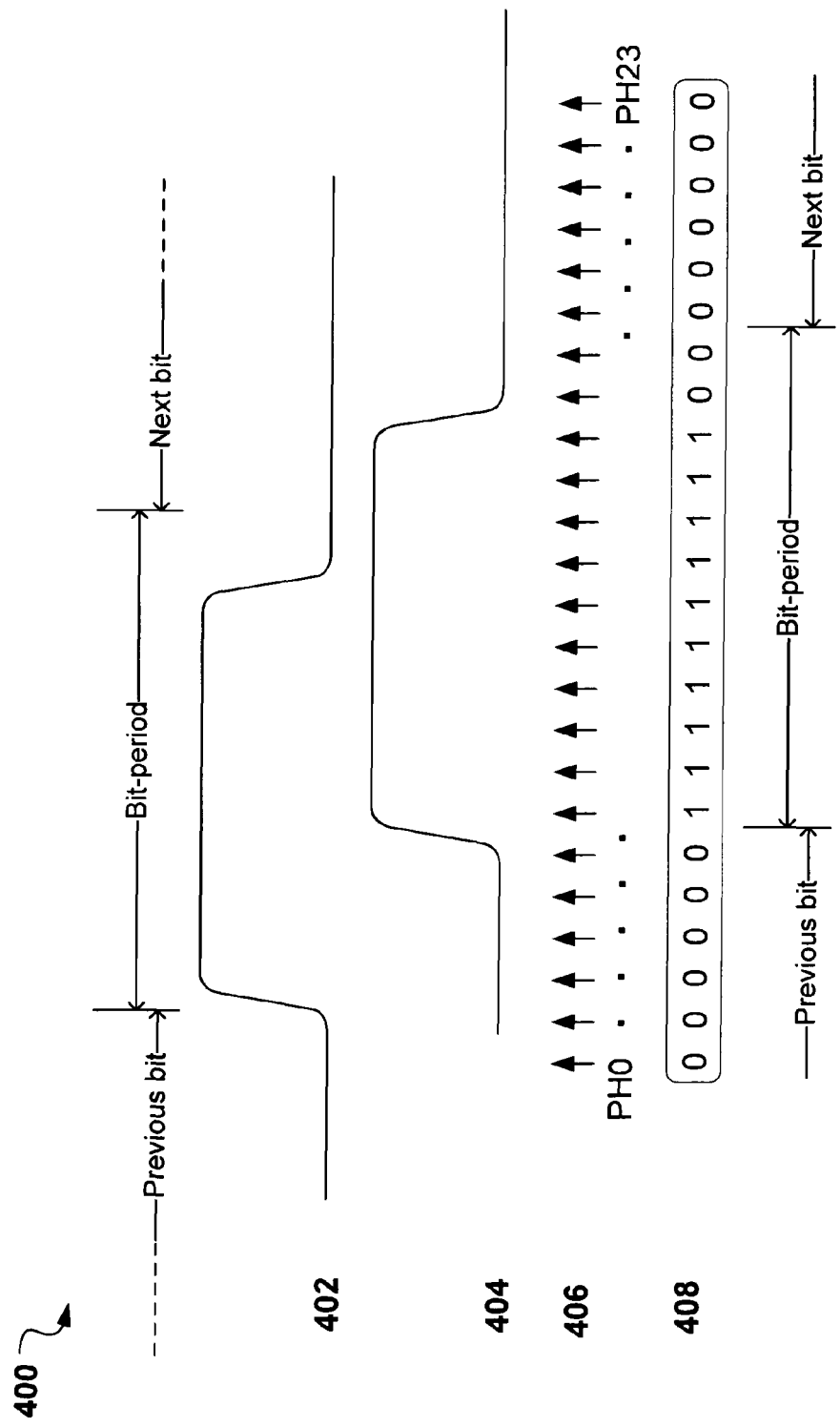
FIG. 6 illustrates with a diagram 400 an example of oversampling in the Oversampling and Reclocking block 316 of FIG. 5.

FIG. 6 illustrates with a diagram 400 an example of oversampling in the Oversampling and Reclocking block 316 of FIG. 5. The diagram 400 in FIG. 6 shows an exemplary waveform 402, a delayed waveform 404, a set of sampling clocks 406, a 24-sample word 408, and a scale indicating a bit-period and previous and next bits.

The exemplary waveform 402 represents an example of the single ended signal 328 (FIG. 5) before phase alignment. Note that the signal appears to be a "1" bit with some distortion (noise or ISI) near the one-zero transition, and it is not aligned with the indicated bit-period. The delayed waveform 404 represents the corresponding phase aligned signal 330 after delay through the Linear Phase Compensator 314. Note that the signal is now approximately aligned with the indicated bit-period, but still includes the distortion. This signal is sampled with the 24 phases of the multiphase clock (PH0 to PH23) as indicated by the set of sampling clocks 406 in the Oversampling and Reclocking block 316, resulting in the 24-sample word 408. The 24-sample word 408 includes six samples (000000) from the previous bit period, twelve samples (111111111100) from the Bit-period and another six samples (000000) from the next bit period.

The 24-sample word 408 is output by the Oversampling and Reclocking block 316 as the 24-sample digital samples signal 332 to the Training Function 318.

The Training Function 318 (FIG. 5) may provide feedback to the Real Time Test Equipment 302 (FIG. 4) by evaluating the 24-sample digital samples signal 332, which is a stream of 24-sample words such as illustrated in the 24-sample word 408 of FIG. 6. In this way, the Real Time Test Equipment 302 may be able to tune the adjustable parameters of the channel boost circuit 100 that is presently being calibrated.

In another approach the Training Function 318 may systematically go through each of the possible permutations of settings of these parameters; observe and measure the quality of the preprocessed signal (the single ended signal 328 that is oversampled as the 24-sample digital samples signal 332) to obtain a quality measure in the form of a "Quality Number"; and retain the settings that yield the best Quality Number in the parameter memory 102 (FIG. 5).

Although the Real Time Calibration method could be conducted under step by step control through the PC, it may be advantageous to allow the Training Function 318 to bypass the Parameter Memory 102 and perform repetitive steps of setting trial values of the parameters (126 and 128) autonomously, and only report the final result for each channel to the PC which may then load the "best" settings into the Parameter Memory 102.

Alternatively, the PC may be used only to start the Real Time Calibration, the final results (the "best setting") being autonomously loaded into the parameter memory without intervention by the PC.

In the calibration methods described above, access to the boost device for controlling the calibration process that includes setting parameters in the boost device, is provided over the control bus comprising "Serial Data" (SDA) and "Serial Clock" (SCL), typically from a control computer (PC). Furthermore, test equipment in the form of a Vector Network Analyzer, a Time Domain Reflectometer, or a high-speed data pattern generator is needed to stimulate the differential high-speed HDMI channels for the calibration. And in the Real Time Calibration method, a complex high-speed oversampling circuit and quality evaluation circuit is built into the expanded boost device 304.

Briefly summarized, it is an objective of the present invention to modify the boost device such that a method of self calibration is enabled by looping the cable from its output back to its input through a test fixture, while control of the parameter selection is performed by a very simple device attached only to the low speed HDMI control bus. The solution (FIGS. 3 to 6) to calibrating a HDMI cable with an embedded boost device has been presented in some detail in order to gain an appreciation of the simplicity of the present invention in which no external high-speed test equipment is required. In additional embodiments, a second copy of the boost device is provided in the test fixture for calibrating the boost device that is part of the cable.

Figure 7A:
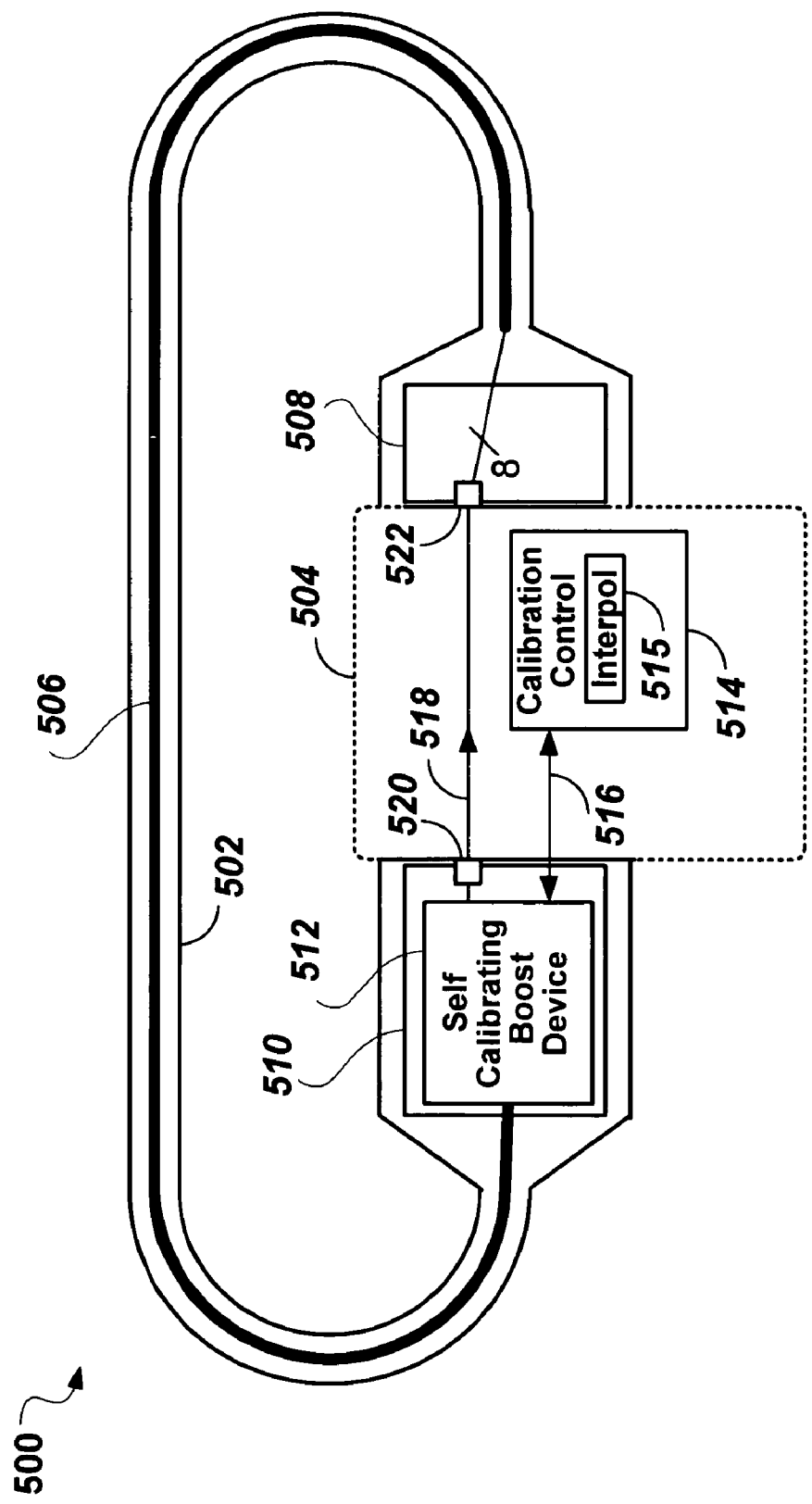
FIG. 7A shows a first embodiment of a self-calibration setup 500 including a self calibrating HDMI cable 502 and a Calibration Fixture 504.

FIG. 7A shows a first embodiment of a self-calibration setup 500 including a self calibrating HDMI cable 502 and a Calibration Fixture 504. The self calibrating (SC) HDMI cable 502 includes a basic (passive) cable 506; an input connector 508; and an output connector 510 which includes a self calibrating (SC) Boost Device 512. The Calibration Fixture 504 includes a calibration control 514 which may be realized in a micro controller or a Field Programmable Gate Array (FPGA) and includes a means for interpolation 515. The calibration control 514 is connected to the SC Boost Device 512 over a link 516. The link 516 is conveniently realized through the HDMI control bus (SDA+SDL) that is also known as the I²C bus. The Calibration Fixture 504 further includes: facilities (not shown explicitly) for the physical connection to the self calibrating HDMI cable 502; a feed-through connection 518 that loops the four high speed HDMI channels (8 wires) of a cable output 520 from the output connector 510 through the Calibration Fixture 504 to a cable input 522 of the input connector 508 of the self calibrating HDMI cable 502; and a power supply (not shown) to provide power to the self calibrating HDMI cable 502 and the calibration control 514.

The objective of this arrangement, briefly stated, is that the self calibrating HDMI cable 502 is calibrated automatically when it is inserted in the Calibration Fixture 504 as soon as power is provided.

This is achieved in the following steps:

(a) Of the four high speed channels, one is activated as a test channel, another as a clock or sampling channel. In an HDMI cable and boost device there are four identical high speed channels, one of which is normally, i.e. in the HDMI application, used as a clock channel while the other three channels carry the video signal. In calibrating the cable, all four channels are considered to be the same, and all four channels need to be calibrated. Thus, the calibration of the test channel with the aid of one of the other channels serving as the sampling channel during the calibration is repeated for each of the other channels as well.

(b) The equalizer of the boost circuit of the test channel is programmed with a set of programmable equalizer parameters. In one method for calibrating each channel, the best set of programmable equalizer parameters is found by cycling through all permutations of programmable equalizer parameters, testing the quality of the channel for each permutation, and loading the parameter memory with the current permutation each time a better channel quality is found. In addition to equalizer parameters, the programmable parameters may also include other parameters, for example intra-pair deskew parameters if the boost circuit includes a programmable intra-pair deskew block.

(c) A simple pattern generator in the boost circuit of the SC Boost Device 512 sends a repetitive test pattern on the test channel into the cable, the test pattern being repeated in a test pattern cycle of M bits. The test pattern should include an isolated "0" bit, and an isolated "1" bit to generate the worst case inter symbol interference (ISI) on the cable. In this way, the "best" parameter setting will stand out.

(d) The pattern generator in the sampling channel of the boost circuit is programmed to send a clock pattern on the clock channel into the cable, that is, a simple alternating "1/0" pattern at the test pattern rate. A single programmable pattern generator associated with each HDMI channel in the boost circuit may conveniently be programmed with either the test pattern or the sampling pattern.

(e) After a round trip through the cable, both the test pattern and the sampling pattern are received back in the boost device at the end of the cable as received data bits and a received sampling clock.

(f) The received sampling clock is delayed through a programmable variable delay, and the waveform of the received test pattern is sampled with an edge of the delayed received sampling clock. Over repeated cycles of the test pattern, the same time slice relative to the beginning of the test pattern can be sampled many times, for example N times. If the waveform of the received test bits is a solid "0" or "1" at the sampling point, each of the N samples will be a logic "0" or "1" respectively. But if the sampling point is near a bit edge of the test pattern, jitter and noise will result in a mix of logic "0"s and "1"s generated by the sampling circuit. When the number of "1"s are counted over a period of N samples, solid "1"s or "0"s will produce counts of N or 0 respectively; but when the sampling is near the bit edge or sampling a noisy signal, an intermediate count between 0 and N may be obtained. The actually observed count obtained from a single sampling point may be translated into a value representing a signal clarity measure C at that sampling point, indicating closeness to the expected value of N or 0 respectively, even if it is unknown whether a "1" or a "0" is expected at that point.

(g) By varying the delay of the delayed received clock it is thus possible to determine the signal quality over all or part of the test pattern. In effect, varying this delay after each N samples are counted produces a numeric picture of the signal quality. Furthermore, simply accumulating the values of the signal clarity measure C obtained over the period of one bit or more of the test pattern can give an estimate of signal quality Q.

(h) However, in the preferred embodiments of the invention, only the edges of an isolated single bit of the received test pattern are analyzed which permits the duration of the bit, i.e. a received pulse width is determined which, when compared with the transmitted pulse width of the same bit in the transmitted test pattern, gives an indication of the quality of the equalization. When the two pulses have the same width, the channel is deemed to be "good", meaning it is now calibrated.

(i) For each permutation of the set of parameters of the boost circuit, the steps (f) and (g) are repeated, and the parameter settings that yield the best match of pulse widths are retained in the parameter memory of the boost circuit, thus completing the calibration of one channel.

(j) the steps (b) to (i) are repeated for each channel until all four high speed channels of the boost device have been calibrated.

Additional embodiments of the invention are variations of the self-calibration setup 500 of FIG. 7A. Two additional embodiments of the invention are shown in FIGS. 7B and 7C.

Figure 7B:
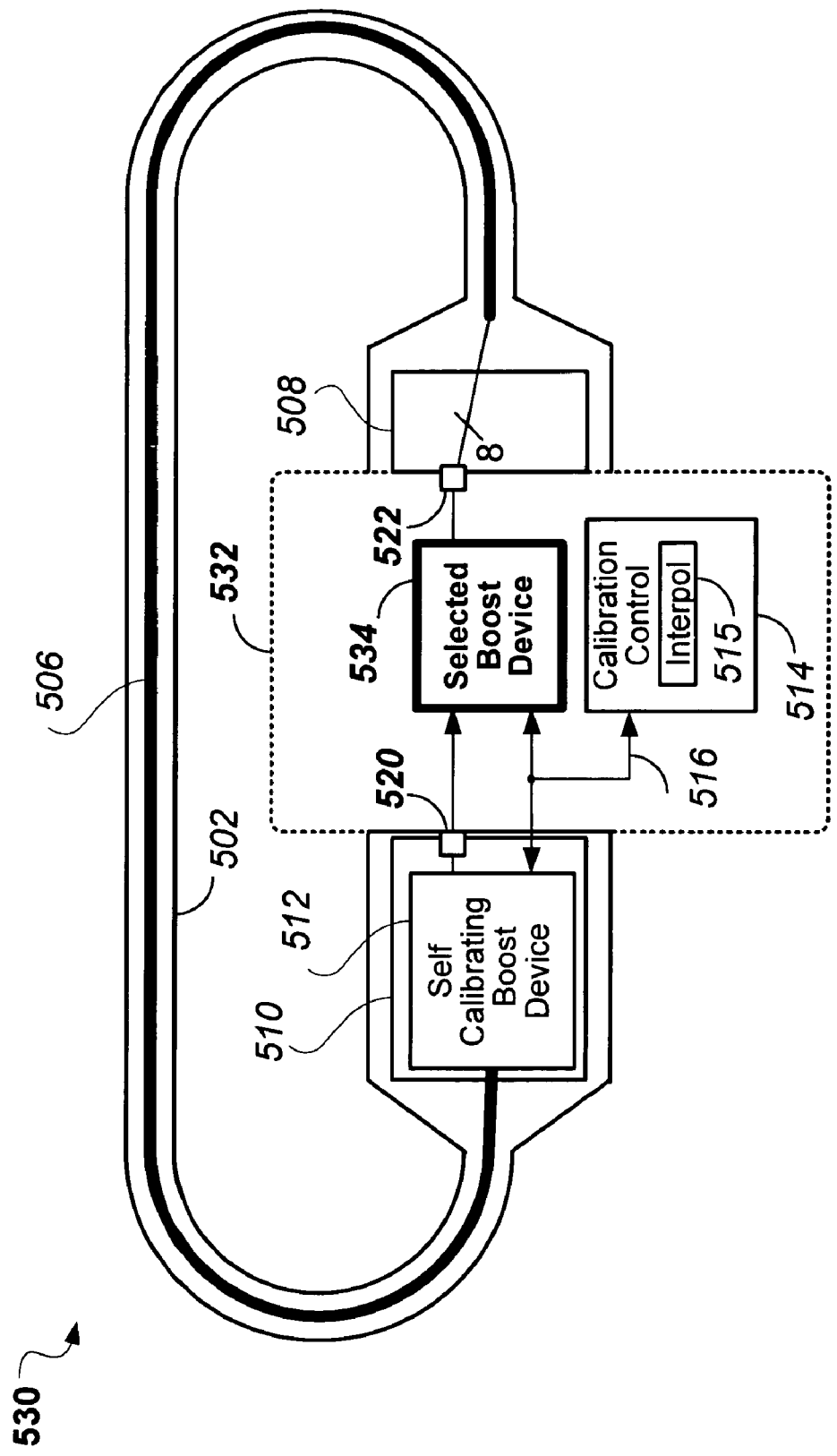
FIG. 7B shows an alternative calibration setup 530 according to a second embodiment of the invention, comprising the self calibrating HDMI cable 502 of FIG. 7A and an augmented Calibration Fixture 532.

FIG. 7B shows an alternative calibration setup 530 according to a second embodiment of the invention, comprising the self calibrating HDMI cable 502 and an augmented Calibration Fixture 532 that includes in addition to the calibration Control 514 a Selected Boost Device 534. The Selected Boost Device 534 is of the same design as the SC Boost Device 512 of the first embodiment shown in FIG. 7A, but the device in the calibration fixture is selected by a screen of manufactured devices for its accuracy at measuring and generating good test stimuli.

The Selected Boost Device 534 receives the boosted signal at the cable output 520 from the self calibrating HDMI cable 502, and sends the same repetitive test patterns into the cable input 522 of the self calibrating HDMI cable 502 as were sent by the SC Boost Device 512 of the self-calibration setup 500 of FIG. 7A.

It is noted that compared to the self-calibration setup 500 shown in FIG. 7A, the SC HDMI cable 502 including its SC Boost Device 512 remains physically unchanged, while the Calibration Fixture 530 is replaced with the augmented Calibration Fixture 532 in the alternative calibration setup 530.

The Selected Boost Device 534 of the augmented Calibration Fixture 532 is connected to the calibration control 514 over the link 516, as is the SC Boost Device 512 of the SC HDMI cable 502. Instead of the SC Boost Device 512 generating the test signal as well as receiving and measuring the response as in the self-calibration setup 500, these calibration tasks are now performed in the same manner by the Selected Boost Device 534 of the alternative calibration setup 532. The corresponding functionality is provided in both the SC Boost Device 512, and the Selected Boost Device 534, the two devices being of the same design. The calibration of the SC HDMI cable 502 is now split between the two boost devices, where the equalizer parameters (and possibly other parameters) of the boost device in the cable (the SC Boost Device 512) are set and controlled by the calibration control 514 as before, but the test pattern is generated and sent into the cable by the Selected Boost Device 534, and the estimation of the resulting signal quality Q is also performed in the Selected Boost Device 534.

The two boost devices (the SC Boost Device 512 and the Selected Boost Device 534), being of the same design, each include, in addition to the programmable signal boosting function, the facilities of generating the test pattern and evaluating the received signal quality. In the alternative self-calibration setup 530, the Selected Boost Device 534 is programmed to generate the test pattern and to evaluate the received signal while the SC Boost Device 512 is programmed to perform the signal boosting function, including the programmable equalization and other signal correction functions if so equipped.

The objective of the alternative calibration setup 530 is again, like the objective of the self-calibration setup 500 of FIG. 7A, to automatically calibrate the self calibrating HDMI cable 502 is when it is inserted in the augmented Calibration Fixture 532, using the same basic sequence of steps as in the first embodiment, modified to account for the fact that two boost devices are involved:

(a2) As described before, of the four high speed channels, one is activated as a test channel, another as a clock or sampling channel. This activation takes place in the Selected Boost Device 534, the device being permanently placed in a "testing mode", while the SC Boost Device 512 operates in a "signal boosting mode". Both the "testing mode" and the "signal boosting mode" are available in both devices and are determined by the calibration control 514 for the purpose of the calibration.

(b2) The equalizer of the boost circuit of the test channel in the SC Boost Device 512 is programmed with its set of programmable equalizer parameters. To calibrate each channel, the best set of programmable equalizer parameters is found by cycling through all permutations of programmable equalizer parameters, testing the quality of the channel for each permutation. In addition to equalizer parameters, the programmable parameters may also include other parameters, for example intra-pair deskew parameters if the boost circuit includes a programmable intra-pair deskew block.

(c2) The pattern generator in the Selected Boost Device 534 sends the repetitive test pattern on the test channel into the cable, in the same way as was described earlier with respect to the SC Boost Device 512 in the self-calibration setup 500.

(d2) The pattern generator in the sampling channel of the Selected Boost Circuit 534 is programmed to send the clock pattern on the clock channel into the cable, in the same way as was described earlier with respect to the SC Boost Device 512 in the self-calibration setup 500.

(e2-1) After a round trip through the cable, both the test pattern and the sampling pattern are received in the SC Boost Device 512 of the cable.

(e2-2) The signals received in the SC Boost Device 512 are equalized and boosted, and the boosted signals are then sent to the Selected Boost Device 534 in the augmented Calibration Fixture 532 as boosted data bits and a boosted sampling clock.

The boosted sampling clock and the boosted data bits are then processed in the Selected Boost Device 534 (steps f2 to h2 following) in the same way as the received data bits and the received sampling clock are processed in the SC Boost Device 512 in the self-calibration setup 500:

(f2) The boosted sampling clock is delayed through a programmable variable delay, and the waveform of the boosted test pattern is sampled with an edge of the delayed boosted sampling clock. Over repeated cycles of the test pattern, the same time slice relative to the beginning of the test pattern can be sampled many times, for example N times. If the waveform of the boosted test bits is a solid "0" or "1" at the sampling point, each of the N samples will be a logic "0" or "1" respectively. But if the sampling point is near a bit edge of the test pattern, jitter and noise will result in a mix of logic "0"s and "1"s generated by the sampling circuit. When the number of "1"s are counted over a period of N samples, solid "1"s or "0"s will produce counts of N or 0 respectively; but when the sampling is near the bit edge or sampling a noisy signal, an intermediate count between 0 and N may be obtained. The actually observed count obtained from a single sampling point may be translated into a value representing a signal clarity measure C at that sampling point, indicating closeness to the expected value of N or 0 respectively, even if it is unknown whether a "1" or a "0" is expected at that point.

(g2) By varying the delay of the delayed boosted clock it is thus possible to determine the signal quality over all or part of the test pattern. In effect, varying this delay after each N samples are counted produces a numeric picture of the signal quality. Furthermore, simply accumulating the values of the signal clarity measure C obtained over the period of one bit or more of the test pattern can give an estimate of signal quality Q.

(h2) However, in the preferred embodiments of the invention, only the edges of an isolated single bit of the boosted test pattern are analyzed which permits the duration of the bit, i.e. a boosted pulse width is determined which, when compared with the transmitted pulse width of the same bit in the transmitted test pattern, gives an indication of the quality of the equalization. When the two pulses have the same width, the channel is deemed to be "good", meaning it is now calibrated.

(i2) For each permutation of the set of parameters of the boost circuit of the SC Boost Device 512, the steps (f) and (g) are repeated, and the parameter settings that yield the best match of pulse widths are retained in the parameter memory of the Selected Boost Device 534 and copied to the parameter memory of the SC Boost Device 512 which completes the calibration of one channel of the cable.

(j2) the steps (b2) to (i2) are repeated for each channel until all four high speed channels of the boost device have been calibrated.

FIG. 7C shows a further alternative calibration setup 550 according to a third embodiment of the invention, comprising the self calibrating HDMI cable 502 and an expanded Calibration Fixture 552 that includes in addition to the calibration Control 514, a Receiving (RX) Boost Device 554, and a Transmit (TX) chip 556. The RX Boost Device 554 is of the same design as the SC Boost Device 512 of the first two embodiments (FIGS. 7A and 7B) as well as the Selected Boost Circuit 534 of the second embodiment (FIG. 7B), but the RX Boost Device 554 in the calibration fixture is preferably selected by a screen of manufactured devices for its accuracy at measuring. In the TX chip 556 a small block of the circuitry of the boost device design is repeated. The TX chip may be implemented according to an off-the-shelf transmitter design in a Field Programmable Gate Array (FPGA).

In the further alternative calibration setup 550, the RX Boost Device 554 receives the boosted signal at the cable output 520 from the self calibrating HDMI cable 502, while the TX chip generates the same repetitive test patterns and sends them into the cable input 522 of the self calibrating HDMI cable 502 as were sent by the SC Boost Device 512 of the self-calibration setup 500 of FIG. 7A.

It is noted that compared to the first and second embodiments shown in FIGS. 7A and 7B, the HDMI cable 502 including its SC Boost Device 512 remains completely unchanged, while the expanded Calibration Fixture 552 replaces the Calibration Fixture 504 (FIG. 7A) and the augmented Calibration Fixture 532 (FIG. 7B) respectively.

The objective of the further alternative calibration setup 550 is again, like the objective of the self-calibration setup 500 of FIG. 7A and the alternative calibration setup 530 of FIG. 7B, to automatically calibrate the self calibrating HDMI cable 502 when it is inserted in the expanded Calibration Fixture 552, again using the same basic sequence of steps as in the first embodiment, modified to account for the fact that now three devices are involved, namely the two boost devices (the SC Boost Device 512 and the RX Boost Device 554) and the TX chip 556:

(a3) As described before, of the four high speed channels, one is activated as a test channel, another as a clock or sampling channel. This activation takes place in the RX Boost Device 554 as well as the TX chip 556, these devices being permanently placed in the "testing mode", while the Boost Device 512 operates in the "signal boosting mode".

(b3) The equalizer of the boost circuit of the test channel in the SC Boost Device 512 is programmed with its set of programmable equalizer parameters. To calibrate each channel, the best set of programmable equalizer parameters is found by cycling through all permutations of programmable equalizer parameters, testing the quality of the channel for each permutation. In addition to equalizer parameters, the programmable parameters may also include other parameters, for example intra-pair deskew parameters if the boost circuit includes a programmable intra-pair deskew block.

(c3) The pattern generator of the TX chip 556 sends the repetitive test pattern on the test channel into the cable, in the same way as was described earlier with respect to the SC Boost Device 512 in the self-calibration setup 500.

(d3) The pattern generator of the TX chip 556 is programmed to send the clock pattern on the clock channel into the cable, in the same way as was described earlier with respect to the SC Boost Device 512 in the self-calibration setup 500.

(e3-1) After a round trip through the cable, both the test pattern and the sampling pattern are received in the SC Boost Device 512 of the cable.

(e3-2) The signals received in the SC Boost Device 512 are equalized and boosted, and the boosted signals are then sent to the RX Boost Device 554 in the expanded Calibration Fixture 552 as the boosted data bits and the boosted sampling clock.

(f3) to (h3) The boosted sampling clock and the boosted data bits are processed in the Selected Boost Device 534 in the same way as the received data bits and the received sampling clock are processed in the RX Boost Device 554 of the alternative calibration setup 530. The processing of the boosted sampling clock and the boosted data bits is described in detail in the steps (f2) to (h2), above.

(i3) For each permutation of the set of parameters of the boost circuit of the SC Boost Device 512, the steps (f3) and (g3) are repeated, and the parameter settings that yield the best match of pulse widths are retained in the parameter memory of the Selected Boost Device 534 and copied to the parameter memory of the SC Boost Device 512 which completes the calibration of one channel of the cable.

(j3) the steps (b3) to (i3) are repeated for each channel until all four high speed channels of the boost device have been calibrated.

Because the test pattern may be repeated many times and the programmable delay may be set to sample the same part of the test pattern, effective oversampling is done over time in the cable calibration procedure of the embodiments of the present invention, without having to generate many oversampling clock phases in the same bit time frame. The new method of using the proposed scheme to merely measure or estimate a pulse width is much simpler and requires much less high-speed circuitry than the performance analysis circuit 308 of FIG. 5 for example. While the oversampling and reclocking circuit 316 of the performance analysis circuit 308 of FIG. 5 generates of a 24-sample digital samples signal 332 representing each received data bit in real time, the effective oversampling proposed in the present invention is stretched out in time, using the stroboscope principle to obtain just one sample during each repetition of the entire test pattern. And instead of evaluating the 24-sample digital samples signal 332 in parallel in the Training Function 318, evaluation of the samples may be done more slowly in a micro controller or a FPGA, such as the calibration control 514, which reads sample counts recorded in a small memory. This takes advantage of closely spaced delay steps and natural jitter and noise near the bit edges of both the test pattern and the sampling clock to generate statistically based counts from which the actual bit edge positions may be readily interpolated, using the means for interpolation 515 of the calibration control 514.

Figure 8A:
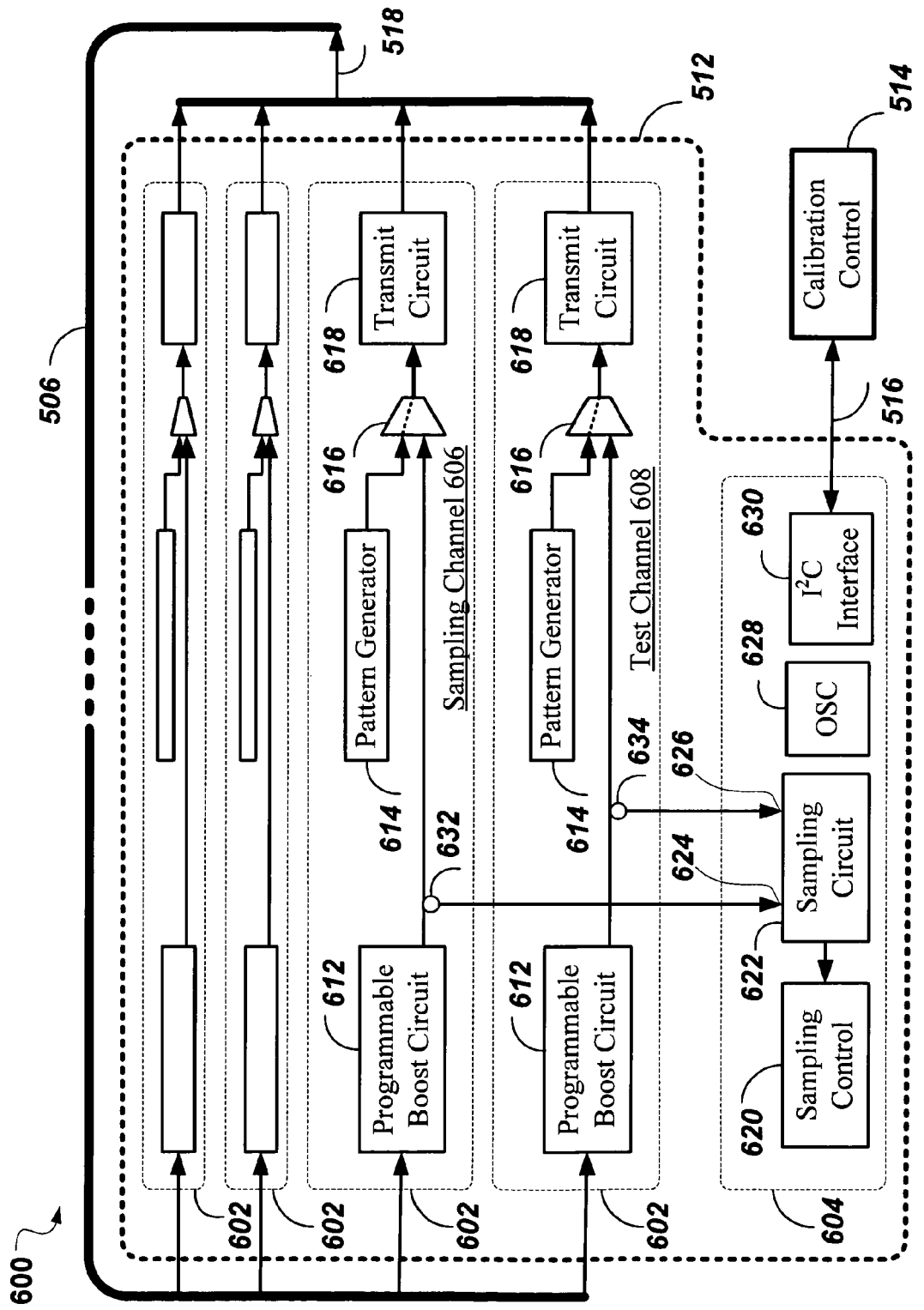
FIG. 8A shows a block diagram 600 of the self calibrating (SC) Boost Device 512 together with the basic cable 506, the Calibration Control 514, and the feed-through connection 518, of the self-calibration setup 500 of FIG. 7A.

FIG. 8A shows a block diagram 600 of the self calibrating (SC) Boost Device 512 together with the basic cable 506, the Calibration Control 514, and the feed-through connection 518, of the self-calibration setup 500 of FIG. 7A.

The SC Boost Device 512 includes four identical Channel Circuits 602 and a Calibration Circuit 604. As shown in FIG. 8A, one of the Channel Circuits 602 is selected and activated as a Sampling Channel 606. A second one of the Channel Circuits 602 is selected and activated as a Test Channel 608. Any of the Channel Circuits 602 may serve as the Sampling Channel 606, and each of the Channel Circuits 602 can be selected as the Test Channel 608. One of several possible configurations is shown in FIG. 8A as an example for the purpose of the description. All Channel Circuits 602 are capable of being selected as Sampling and Test Channels 606 and 608 respectively under control of the Calibration Control 514. The block diagram 600 shows each channel circuit 602 to include a Programmable Boost Circuit 612 with one input and one output, a Pattern Generator 614 with one output, a Multiplexer 616 with first and second inputs and an output, and a Transmit Circuit 618 with one input and one output. The Calibration Circuit 604 includes: an Sampling Control 620 with one input; a Sampling Circuit 622 with one output, a sampling input 624, and a test data input 626; a Test Oscillator (OSC) 628; and an I²C interface 630 with a bidirectional input/output. In the interest of clarity, not all inputs and outputs of all circuit blocks are shown in the block diagram 600.

The output of the Transmit Circuit 618 of each channel circuit 602 is connected through the feed-through connection 518 to one end of the basic cable 506. The other end of the basic cable 506 is connected to the input of the Programmable Boost Circuit 612 of each channel circuit 602, the cable providing a loop-back path from the output of each Transmit Circuit 618 to the input of the corresponding Programmable Boost Circuit 612 in the same channel circuit 602.

Within each channel circuit 602, the output of the Programmable Boost Circuit 612 is connected to the first input of the Multiplexer 616; the output of the Pattern Generator 614 is connected to the second input of the Multiplexer 616; and the output of the Multiplexer 616 is connected to the input of the Transmit Circuit 618.

A sampling tap 632 on the output of the Programmable Boost Circuit 612 of the Channel Circuits 602 that is currently activated as the Sampling Channel 606, is connected to the sampling input 624 of the Sampling Circuit 622. Similarly, a data tap 634 on the output of the Programmable Boost Circuit 612 of the Channel Circuits 602 that is currently activated as the Test Channel 608, is connected to the test data input 626 of the Sampling Circuit 622. The output of the Sampling Circuit 622 is connected to the input of the Sampling Control 620. The sampling tap 632 and the data tap 634 are attached in the Sampling Channel 606 and the Test Channel 608 respectively as shown to indicate one configuration that may be used in the calibration of the Test Channel 608. When calibrating the SC Boost Device 512, each of the Channel Circuits 602 must in turn be activated as the Test Channel 608 and calibrated, while any of the other Channel Circuits 602 may be chosen as the Sampling Channel 606. Note that the Channel Circuit 602 that is used as the Sampling Channel 606, does not already need to have been calibrated because even before the cable is calibrated, it will carry the sampling clock adequately for the purpose of calibrating the Test Channel 608.

The Multiplexer 616 is used to select the signal to be transmitted by the Transmit Circuit 618 of each Channel Circuit 602. In calibration mode as shown here in FIG. 8A, the output of the Pattern Generator 614 is selected and switched through the Multiplexer 616 to the input of the Transmit Circuit 618, as indicated by a dotted line in the diagram. In this way a boosted signal path extends from the Pattern Generator 614; through the Multiplexer 616; through the Transmit Circuit 618; through the feed-through connection 518; through the basic cable 506; through the Programmable Boost Circuit 612; and on to the Sampling Circuit 622 for those two Channel Circuits 602 for which a sampling tap or data tap (632 or 634) currently exists. The other Channel Circuits 602 are of no interest until they are activated as the Test Channel 608 for calibration, or as the Sampling Channel 606.

When in mission mode (i.e. the "signal boosting mode"), that is when the self calibrating HDMI cable 502 is used to connect an HDMI source to an HDMI sink, in a configuration similar to the one shown in FIG. 1, the output of the Programmable Boost Circuit 612 is selected in the Multiplexer 616 and switched to the input of the corresponding Transmit Circuit 618 in every Channel Circuit 602, thus providing a boosted signal path that extends from the input of every Programmable Boost Circuit 612 to the output of the corresponding Transmit Circuit 618. The mission mode may be selected permanently once the cable has been calibrated.

The description of the self calibrating (SC) Boost Device 512 includes functionalities of both the mission mode and the calibration mode implemented in the device. While both these modes are provided by design in the SC Boost Device 512, the Selected Boost Device 534, as well as the RX Boost Device 554, the calibration mode as well as the mission mode are used in the SC Boost Device 512 only in the first embodiment, i.e. the self-calibration setup 500 of FIG. 7A.

In the second and third embodiments (FIGS. 7B and 7C), the SC Boost Device 512 in the cable is permanently set to mission mode although it is able to receive parameter settings from the calibration control 514 while the cable is connected to the calibration fixture. In the second and third embodiments (FIGS. 7B and 7C), the task of generating the test pattern is delegated to the Selected Boost Device 534 or the TX Chip 556 respectively while the task of measuring the response is performed in the Selected Boost Device 534 or the RX Boost Device 554 respectively.

Figure 8B:
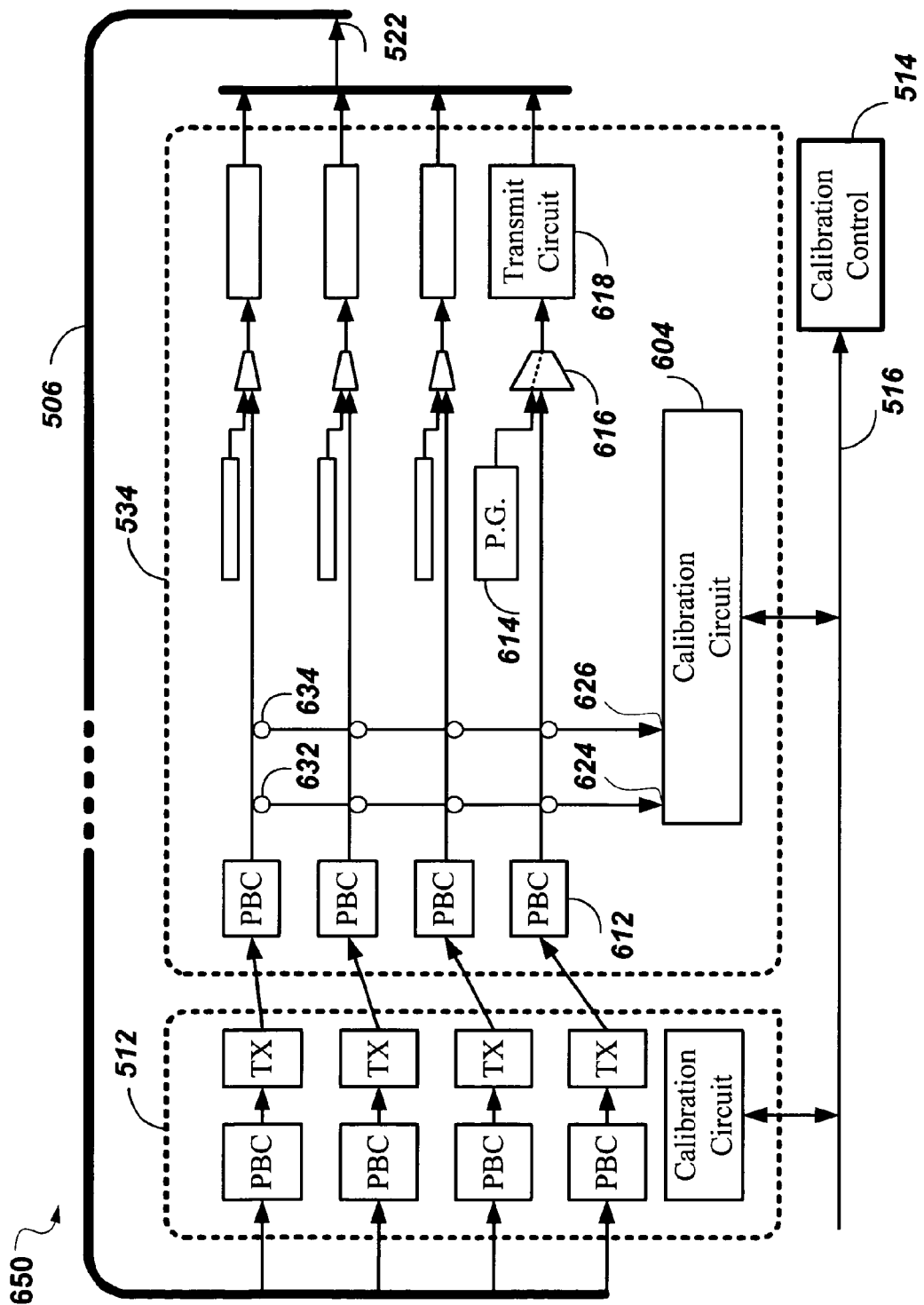
FIG. 8B shows a block diagram 650 of the self calibrating (SC) Boost Device 512 together with the basic cable 506, the Calibration Control 514, and the Selected Boost Device 534, of the alternative calibration setup 530 of FIG. 7B.

FIG. 8B shows a block diagram 650 of the self calibrating (SC) Boost Device 512 together with the basic cable 506, the Calibration Control 514, and the Selected Boost Device 534, of the alternative calibration setup 530 of FIG. 7B.

In this configuration, the SC Boost Device 512 being set in its "normal" boosting mode, receives the signal from the basic cable 506 and drives the Programmable Boost Circuits (PBC) 612 of the Selected Boost Device 534. The Selected Boost Device 534 in the augmented Calibration Fixture 532 (FIG. 7B) was selected (screened) from manufactured boost devices for its accuracy in measuring and was already calibrated at that time.

The Selected Boost Device 534, is preferably implemented to be identical to the SC Boost Device 512, and thus includes a set of identical circuit elements shown with identical reference numerals for convenience, such as:

another Calibration Circuit 604; another set of PBCs 612; another set of Pattern Generators 614; another set of Multiplexers 616; another set of Transmit Circuits 618; another Sampling Circuit 622; another Sampling Control 620; another $I^2C$ interface 630; etc.

In the Selected Boost Device 534, the outputs of the PBCs 612 are tapped with the sampling taps and data taps (632 and 634 respectively) that provide the inputs to the Calibration Circuit 604 for the purpose of measuring the quality of the equalization in the SC Boost Device 512 in the self calibrating HDMI cable 502. At the same time, the Pattern Generators 614 of the Selected Boost Device 534 are driving the cable input 522 of the cable via the Multiplexers 616 and the Transmit Circuits 618. The Calibration Circuit 604 of the Selected Boost Device 534 is controlled by the Calibration Control 514 over the I2C bus 516 to: select the sampling and data patterns in the Pattern Generators 614; set the Multiplexers 616 to send the generated patterns to the Transmit Circuits; and collect the measurement results from the PBCs 612.

For each HDMI channel, the Calibration Control 514 initiates the calibration sequence by setting programmable parameters of the SC Boost Device 512, selects the pattern generators in the Selected Boost Device 534, reads measurement results from the Selected Boost Device 534, and then transfers the resulting "best" parameter values into the SC Boost Device 512 over the I2C bus 516 thus achieving the calibration of that device.

Figure 8C:
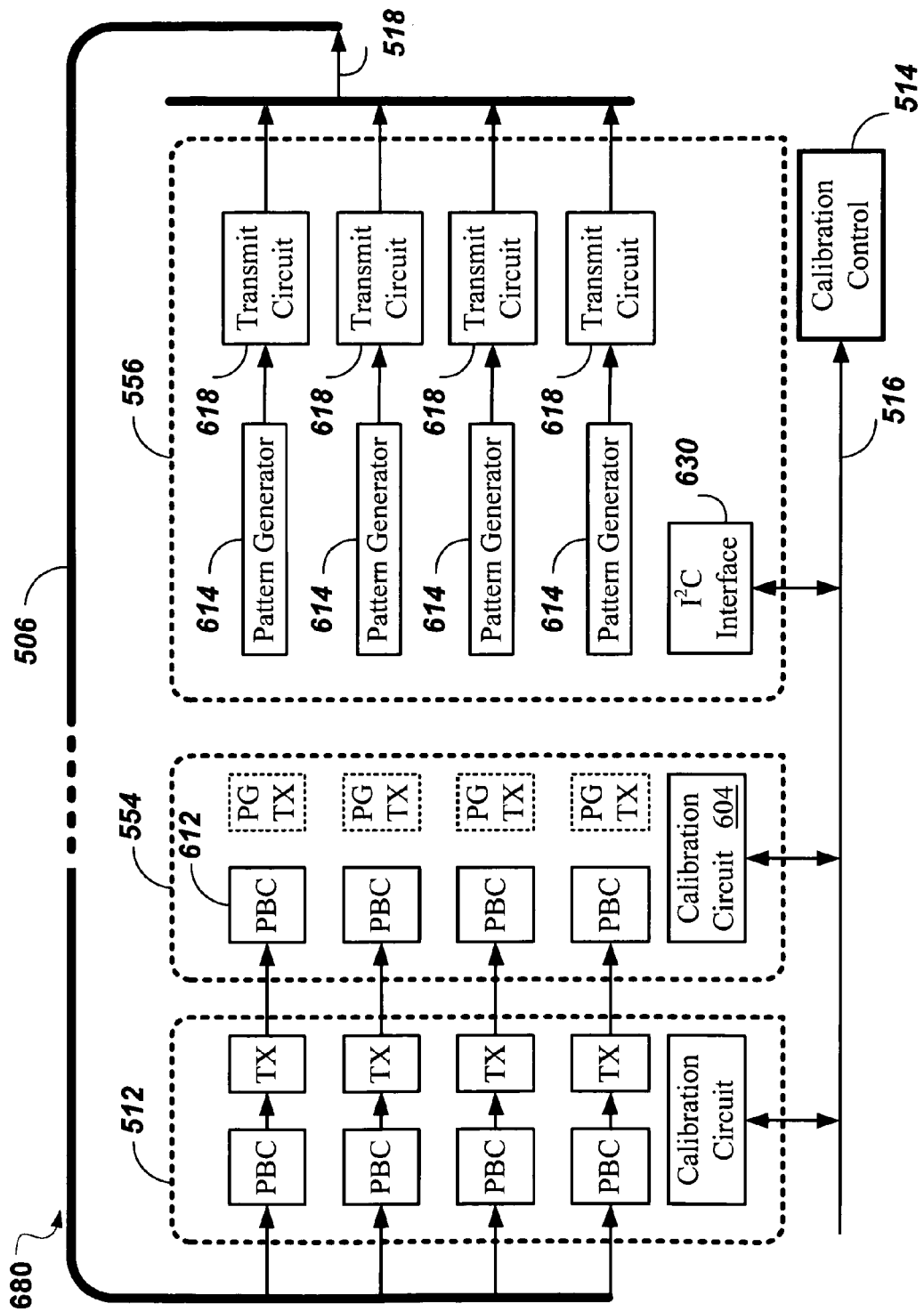
FIG. 8C shows a block diagram 680 of the self calibrating (SC) Boost Device 512 together with the basic cable 506, the Calibration Control 514, the RX Boost Device 554, and the TX Chip 556 of the further alternative calibration setup 550 of FIG. 7C.

FIG. 8C shows a block diagram 680 of the self calibrating (SC) Boost Device 512 together with the basic cable 506, the Calibration Control 514, the RX Boost Device 554, and the TX Chip 556 of the further alternative calibration setup 550 of FIG. 7C.

In this configuration, the SC Boost Device 512 being set in its "normal" boosting mode, receives the signal from the basic cable 506 and drives the Programmable Boost Circuits (PBC) 612 of the RX Boost Device 554. The RX Boost Device 554 in the augmented Calibration Fixture expanded Calibration Fixture 552 (FIG. 7C) was selected from manufactured boost devices (screened) for its accuracy in measuring and was already calibrated at that time.

The RX Boost Device 554, may be implemented to be identical to the SC Boost Device 512, and thus includes a set of identical circuit elements shown with identical reference numerals for convenience, such as yet another Calibration Circuit 604 and yet another set of PBCs 612. It also includes yet another set of Pattern Generators 614; yet another set of Multiplexers 616; yet another set of Transmit Circuits 618; yet another Sampling Circuit 622; yet another Sampling Control 620; yet another $I^2C$ interface 630; etc.

In the RX Boost Device 554, the outputs of the PBCs 612 are tapped with the sampling taps and data taps that provide the inputs to the Calibration Circuit 604 for the purpose of measuring the quality of the equalization in the SC Boost Device 512 in the self calibrating HDMI cable 502, in the same way as in the first and second embodiments (FIGS. 8A and 8B).

The pattern generation and transmit circuit sections (PG/TX) of the RX Boost Device 554 are not used. Instead, the TX Chip 556 provides this functionality with the same circuit elements, as shown in FIG. 8C. In the TX Chip 556, the (yet another set of) Pattern Generators 614 are driving the cable input 522 of the cable via the (yet another set of) Transmit Circuits 618, under control of the Calibration Control 514 by way of (yet another copy of) the I2C interface 630. The Calibration Circuit 604 of the RX Boost Device 554 is (also) controlled by the Calibration Control 514 over the I2C bus 516, namely to collect the measurement results from the PBCs 612 in the RX Boost Device 554.

For each HDMI channel the Calibration Control 514 initiates the calibration sequence by setting programmable parameters of the SC Boost Device 512, selects the pattern generators in the TX Chip 556, reads measurement results from the RX Boost Device 554, and then transfers the resulting "best" parameter values into the SC Boost Device 512 over the I2C bus 516 thus achieving the calibration of that device.

It is noted that the method for calibrating the SC Boost Device 512 in the cable is essentially the same in all three embodiments. The SC Boost Device 512 is self-contained in terms of generating test patterns and measuring the results. In the second and third embodiments, an additional copy of the boost device is selected and mounted in the test fixture with the aim of improving the accuracy of calibration by the use of screened devices for the measurement, i.e. the Selected Boost Device 534 and the RX Boost Device 554 respectively, and ignoring the self-calibrating capability of the SC Boost Device 512 of the cable. While all three boost devices (the Boost Device 512, the Selected Boost Device 534, and the RX Boost Device 554) are identical from a design point of view, it is clear that cost reductions may be obtained with the second and third embodiments in practice. By not making use of the circuitry for self-calibration in the SC Boost Device 512 in the cable, devices in which this circuitry does not work perfectly, not work at all, or even is completely absent, can be used. Furthermore, the pattern generation and multiplexing circuitry may be omitted from the design in a further cost reduction when the TX Chip 556 provides this functionality.

Figure 9:
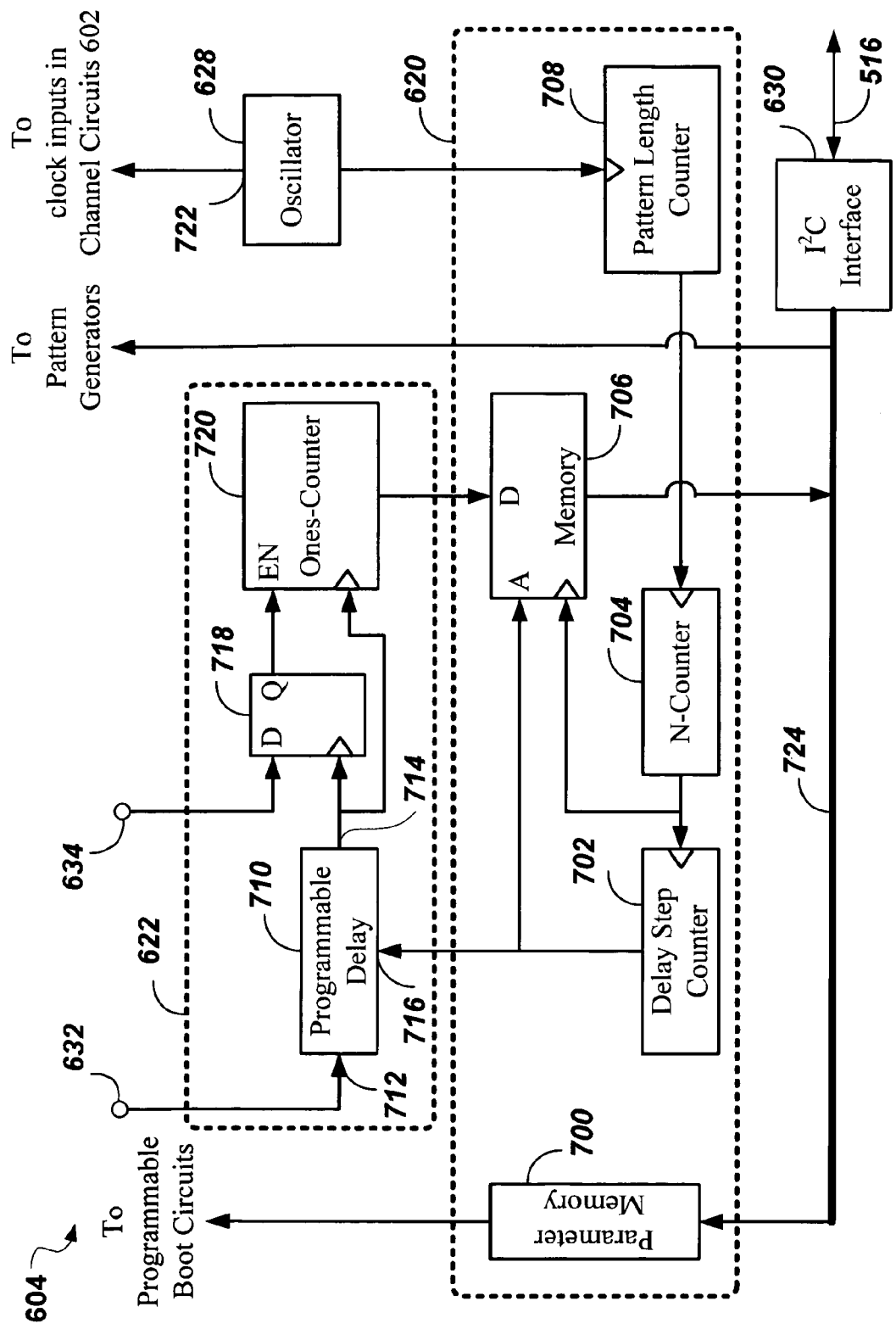
FIG. 9 shows a block diagram of components of the Calibration Circuit 604 of FIG. 8A in more detail.

FIG. 9 shows a block diagram of components of the Calibration Circuit 604 of FIGS. 8A to 8C in more detail, the same reference numerals as in FIG. 8A indicating like items. The Sampling Control 620 includes a Parameter Memory 700; a Delay Step Counter 702; an N-Counter 704; a small Memory 706 having an address (A) and a data (D) input; and a Pattern Length Counter 708. The Sampling Circuit 622 includes a Programmable Delay 710 which is a binary-controlled delay circuit and has a signal input 712, a delayed sampling pulse output 714, and a delay programming input 716; a sampling circuit element implemented as a sampling Flip Flop (FF) 718; and a means for determining an average of the values of N generated samples implemented as a Ones-Counter 720.

The Oscillator 628 has an output 722 which is connected (not shown) to clock inputs of the Pattern Generators 614 and of the Transmit Circuits 618 in the Channel Circuits 602. The Oscillator 628 is also connected to chain of counters that begins with the Pattern Length Counter 708. The Oscillator 628 drives a clock input of the Pattern Length Counter 708. An output (which may be the carry-output or the most significant bit) of the Pattern Length Counter 708 drives a clock input of the Divide-By-N Counter (N-Counter) 704. An output (which may be the carry-output or the most significant bit) of the Divide-By-N Counter 704 drives a clock input of the Delay Step Counter 702 (to be also referred to as means for varying the programmable delay) as well as a clocked write input of the Memory 706. An output from the Delay Step Counter 702 drives a delay programming input 716 of the Programmable Delay 710, as well as the address input (A) of the Memory 706.

The signal input 712 of the Programmable Delay 710 receives a sampling clock signal from the sampling tap 632 in the activated Sampling Channel 606; from this the Programmable Delay 710 generates a delayed sampling pulse 714 which drives the clock input of the sampling FF 718 as well as the clock input of the Ones-Counter 720. The D-input of the sampling FF 718 receives a data signal from the data tap 634 in the activated Test Channel 608. Not shown in FIG. 9 are sampling tap and data tap activators (selectors) which may be used to attach the corresponding taps to the appropriate Channel Circuits 602 under control of the Calibration Control 514 (to be also referred to as means for interpolating between delay steps). The Q-output of the sampling FF 718 drives an enable (EN) input of the Ones-Counter 720, and the binary contents (the ones count) of the Ones Counter 720 is transmitted as data to the Memory 706 when it is clocked by the output of the N-Counter 704. The Memory 706 is addressed by the output of the Delay Step Counter 702, thus storing a ones count for each delay step, for subsequent analysis by the Calibration Control 514.

While the means for determining an average of generated samples is preferably implemented in a simple way with the Ones Counter 720 as shown here, other implementations are also feasible, for example an accumulator or other circuit.

The I²C interface 630 provides a link between the bidirectional I²C-bus 516 that connects to the Calibration Control 514 (FIG. 8A) and an internal control bus 724. The internal control bus 724 provides control access into the self calibrating Boost Device 512 for programming the Pattern Generators 614 in the Channel Circuits 602, and through the Parameter Memory 700 the Programmable Boot Circuits 612. Not shown in FIG. 9 are the reset signals of the counters (702, 704, 706, 720) and the Memory 706 which are also reached through the internal control bus 724. The output of the Memory 706 is coupled to the internal control bus 724.

The Calibration Circuit 604 (FIG. 9) is present in all three devices, the SC Boost Device 512, the Selected Boost Device 534, as well as the RX Boost Device 554. In the SC Boost Device 512 its functions may be controlled for mission mode (selected parameters stored in the Parameter Memory 700), and for measuring received or boosted data bits (sampling in the Sampling Circuit 622) in the calibration mode through the I²C interface 630. In the Selected Boost Device 534 and the RX Boost Device 554, the Calibration Circuit 604 is always set in calibration mode.

The Selected Boost Device 534, preferably being implemented to be identical to the SC Boost Device 512, thus includes another set of identical circuit elements as those shown in FIG. 9, such as:

another Parameter Memory 700; another Delay Step Counter 702; another N-Counter 704; another small Memory 706; another Pattern Length Counter 708; another Programmable Delay 710; another sampling circuit element implemented as another sampling Flip Flop (FF) 718; and another means for determining an average of the values of N generated samples implemented as another Ones-Counter 720.

The RX Boost Device 554, preferably being implemented to be identical to the SC Boost Device 512 as well, includes yet another set of identical circuit elements as the circuit elements listed for the Selected Boost Device 534 above.

To facilitate the description of the functions of the self calibrating Boost Device 512 and its Calibration Circuit 604, a set of timing diagrams and a set of flow charts are introduced.

Figure 10:
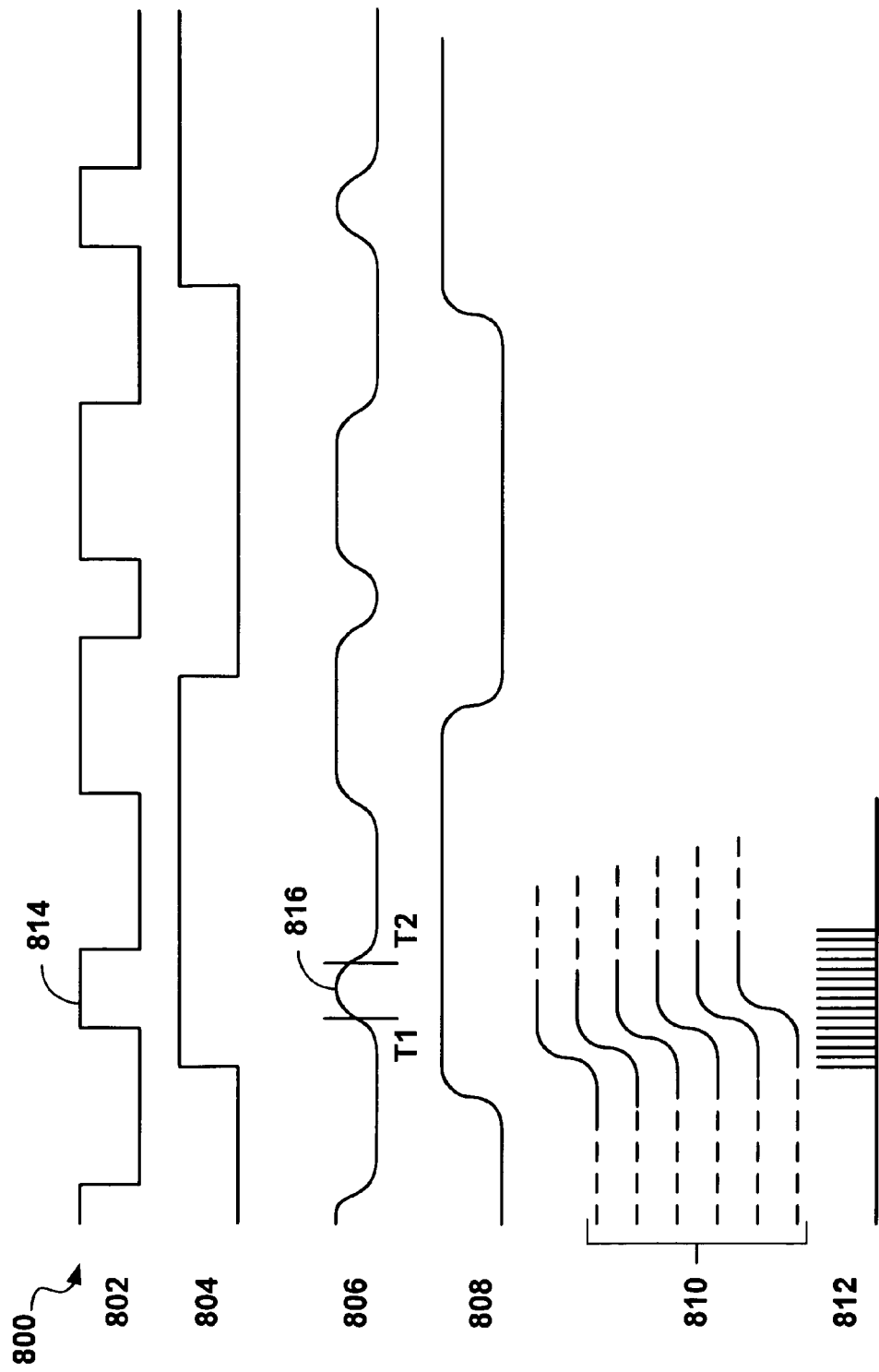
FIG. 10 shows a timing diagram 800 illustrating wave form examples pertaining to the self calibrating Boost Device 512.

FIG. 10 shows a timing diagram 800 illustrating wave form examples pertaining to the self calibrating Boost Device 512 (in the first embodiment, FIG. 7A), comprising wave forms of: a transmitted test pattern 802 including a transmitted single "1" bit 814; a transmitted sampling pattern 804; a received test pattern 806 including a received single "1" bit 816 and rising and falling edges of this bit T1 and T2 respectively; a received sampling pattern 808; a partial series of delayed sampling clocks 810; and a compact representation 812 of the series of delayed sampling clocks 810.

The transmitted test pattern 802 is representative of the signal generated by the Test Pattern Generator 614 and transmitted in the Test Channel 608 of the SC Boost Device 512 and the Selected Boost Device 534, as well as equivalent circuits in the TX Chip 556. The transmitted test pattern 802 is designed to make the pattern balanced, and to separate the single "1" bit 814 by at least two consecutive "0" bits, so that any inter symbol interference (ISI) introduced in the cable strongly affects the single "1" bit 814. In the calibration of the Test Channel 608, the Programmable Boost Circuit 612 is then adjusted until the shape of the received single "1" bit 816 is as close as possible to the shape of the transmitted single "1" bit 814, thus optimally compensating for the ISI or other impairments introduced by the basic cable 506).

The transmitted sampling pattern 804 is another representative of the signal generated by the Test Pattern Generator 614 which is transmitted in the Sampling Channel 606. The transmitted sampling pattern 804 is designed to resemble a simple square wave with a rising edge coincident with or near the edges of the single "1" bit of the transmitted test pattern 802.

The transmitted test pattern 802 and the transmitted sampling pattern 804 are merely examples of patterns that may programmed by the Calibration Control 514 into the Test Pattern Generator 614.

The wave form of the received test pattern 806 is illustrative of the signal received at the data tap 634 in the Test Channel 608, and the received sampling pattern 808 is illustrative of the signal received at the sampling tap 632 in the Sampling Channel 606. The latter signal (808) appears at the signal input 712 of the Programmable Delay 710 (FIG. 9). Not shown in FIG. 10 is the precise timing relationship of the transmitted and the received signals. Although the transmitted test and sampling patterns 802 and 804 are emitted in close synchronism, being generated by a common clock (the Oscillator 628, FIG. 8A), the received test and sampling patterns 806 and 808 are delayed and may also skewed with respect to each other, as a result of having traveled through the cable.

Each of the series of delayed sampling clocks 810 illustrates a different representative phase of for N consecutive repetitions of the sampling clock pattern 808 the delayed sampling pulse 714 (FIG. 9) of the Programmable Delay 710. Although shown here together in the same diagram, the delayed sampling clocks 810 do not appear in the same time frame; rather each is repeated N times before being replaced by another phase.

The compact representation 812 of the series of delayed sampling clocks 810 shows only the active (positive) edges of the delayed sampling clocks 810. This illustrates the virtual oversampling of the same (repetitive) test pattern that occurs over a period time.

The timing diagram 800 applies analogously also to the calibration method of the second and third embodiments (FIGS. 8B and 8C) in which the virtual oversampling of the received data bits is performed in the Selected Boost Device 534 and the RX Boost Device 554 respectively, and in which the transmitted test pattern 802 is transmitted from the Selected Boost Device 534 and the TX Chip 556 respectively.

Figure 11:
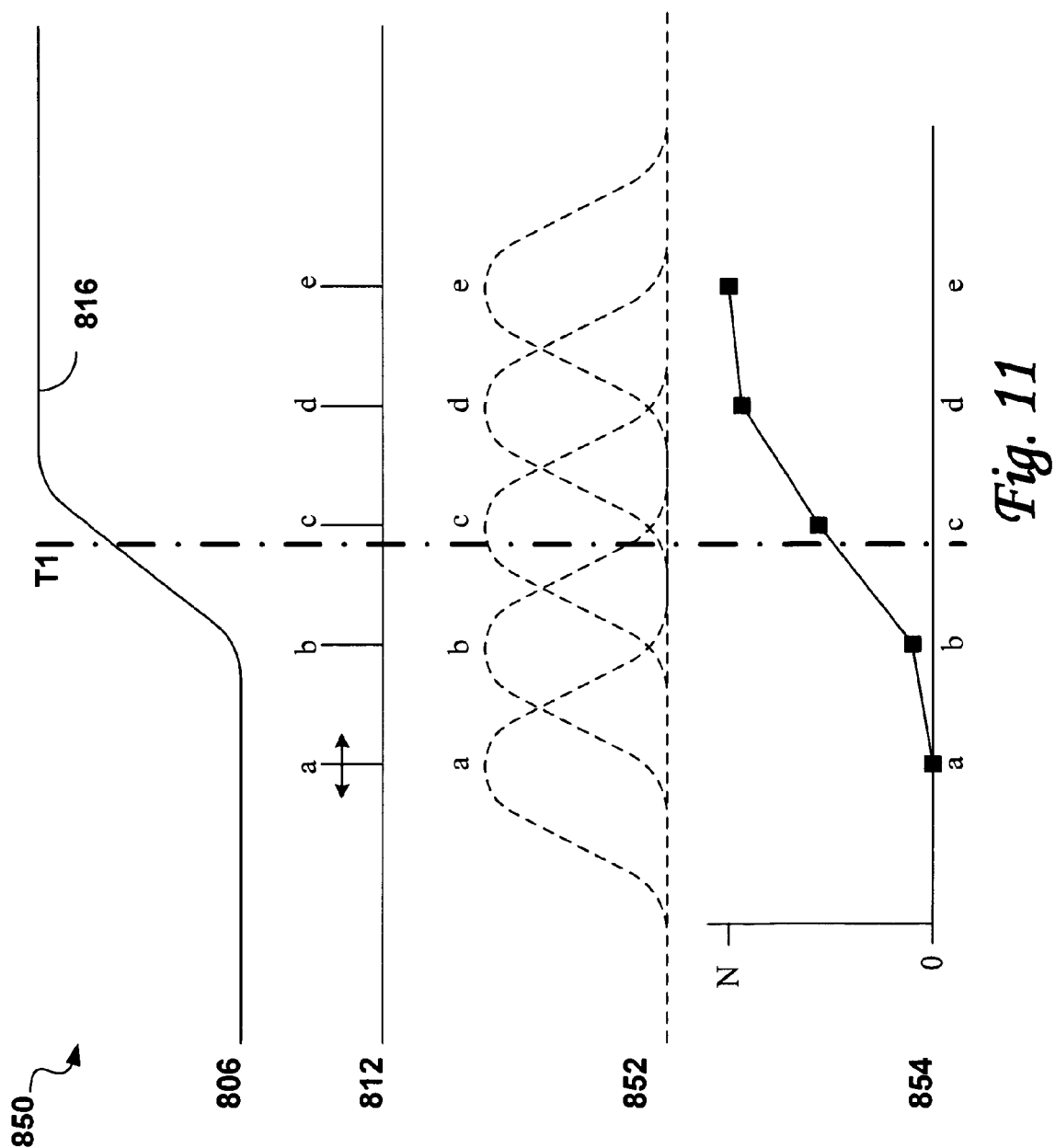
FIG. 11 shows an edge sampling diagram 850 illustrating magnified parts of wave forms from FIG. 10.

FIG. 11 shows an edge sampling diagram 850 illustrating magnified parts of wave forms from FIG. 10, that is the received test pattern 806 including the received single "1" bit 816 with the leading edge T1, and the compact representation 812 of the series of delayed sampling clocks 810 including sampling pulses "a" to "e". The edge sampling diagram 850 further includes a series of bell curves 852 also marked "a" to "e". Each bell curve 852.a to 852.e illustrates that each of the corresponding delayed sampling clocks 810.a to 810.e is typically spread out over time due to jitter and noise. The bell curves also include a similar effect caused by the slight inaccuracy in sampling the received single "1" bit 816 in the sampling Flip Flop (FF) 718 (FIG. 9). The width of each bell curve 852 appears large in this diagram because of the high frequencies involved. The duration of the received single "1" bit 816 may typically be of the order of 500 pico seconds (pS), and the spacing of the delayed sampling clocks 810, i.e. the resolution of the Programmable Delay 710 may be on the order of 10 to 50 pS. The edge sampling diagram 850 further includes a sampling counts chart 854. The horizontal axis is marked "a" to "e", and the vertical axis represents a scale from 0 to N. Solid squares in the sampling counts chart 854 indicate the content of the Ones-Counter 720 (FIG. 9) after the received single "1" bit 816 was sampled N times with each of the sampling pulses "a" to "e" respectively. The "1"s sampling count for "a" is 0 (zero) resulting from the sampling the waveform of the received test pattern 806 (before received single "1" bit 816) when it is still logic "0"; similarly, the "1"s sampling count for "e" is N resulting from the sampling the waveform of the received single "1" bit 816 when it is a logic "1"; but the sampling counts "b", "c", and "d" each have intermediate values between 0 and N resulting from the sampling the waveform of the received single "1" bit 816 along the slope of the rising edge of the received single "1" bit 816. For example, the bell curve for "c" shows that statistically somewhat less than half of the samples will report "0" (below an assumed "0"/"1" threshold of the sampling Flip Flop (FF) 718) and thus not be counted, and somewhat more than half of the samples will report "1". Correspondingly the "1"s count for "c" is intermediate. Each "1"s count represents an averaging measurement of the signal level at the delay step of to the Programmable Delay 710. By interpolating the "1"s counts along the slope, it is possible to estimate the actual edge of the slope T1 after sampling the wave form of the received single "1" bit 816 in the vicinity of the slope.

The pulse width of the received single "1" bit 816 may thus be estimated by determining the relative position in time of the "0"-"1" transition (T1 shown in FIG. 11), similarly determining the relative position in time of the "1"-"0" transition (T2), and subtracting the two. With distortion, this pulse width may not be equal to the (known) pulse width of the transmitted single "1" bit 814. The task of the calibration is to vary parameters of the Programmable Boost Circuit 612 until they are as close as possible or equal.

Figure 12:
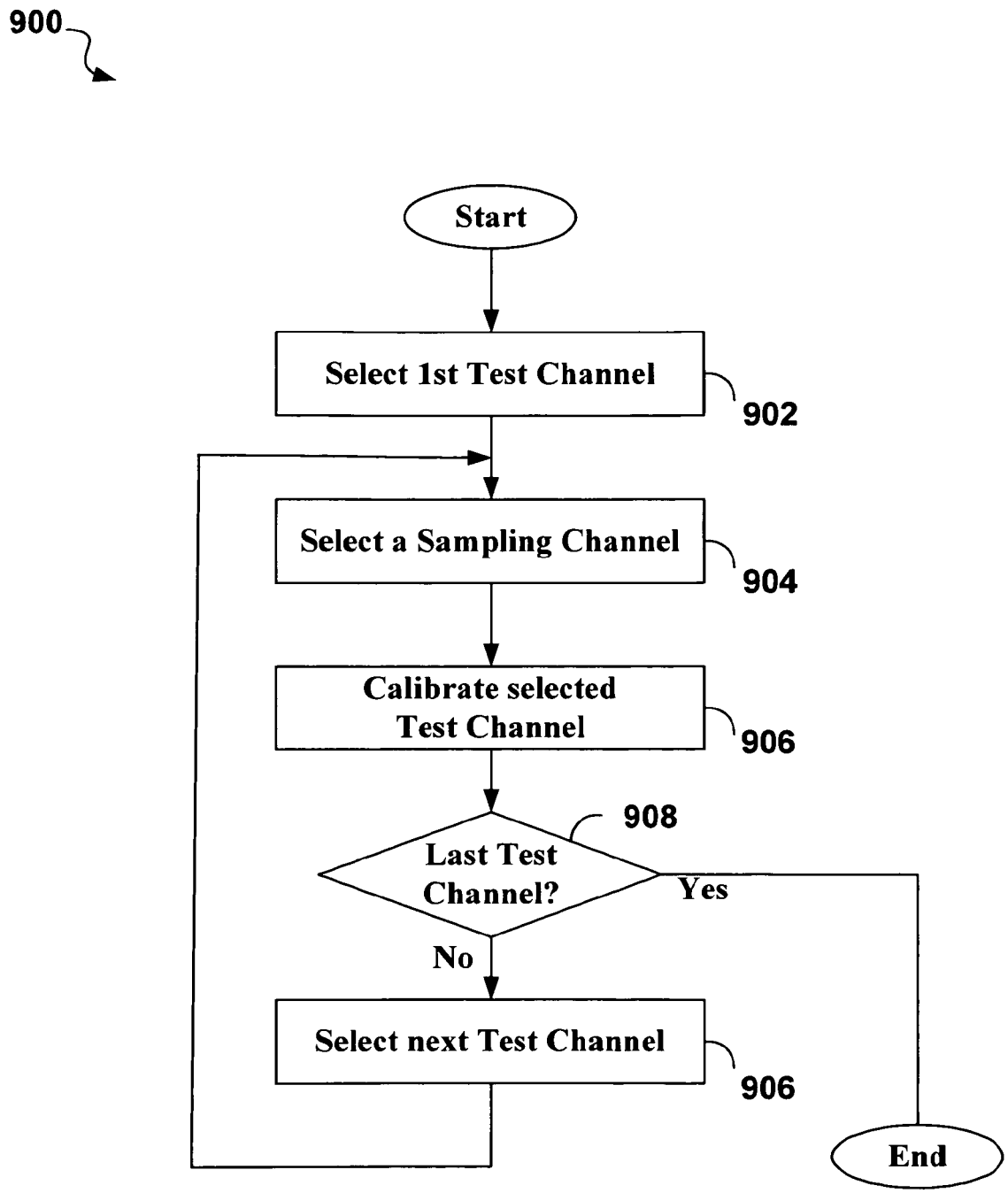
FIG. 12 shows an overall flow chart 900 of the calibration progress of the self-calibration setup 500 of FIG. 7A.

FIG. 12 shows an overall flow chart 900 of the calibration progress of the self-calibration setup 500 of FIG. 7A, as well as the alternative calibration setup 530 of FIG. 7B and the further alternative calibration setup 550 of FIG. 7C, including steps:

902: "Select 1st Test Channel";
904: "Select a Sampling Channel";
906: "Calibrate the selected Test Channel";
908: Determine if this the "last Test Channel?"; and
910: "Select next Test Channel".

In all three embodiments of the invention (FIGS. 7A-7C), the calibration process is always directed at calibrating the cable by selecting the parameter values in the Channel Circuits 602 of the SC Boost Device 512 of the cable. The three embodiments differ in the location of the Pattern Generators 614 that are active in generating the test pattern for each channel (in the SC Boost Device 512, the Selected Boost Device 534, and the TX Chip 556 respectively), and the location of the active Calibration Circuit 604 that is active in measuring the response (in the SC Boost Device 512, the Selected Boost Device 534, and the RX Boost Device 554 respectively).

The top-level flow chart 900 reflects the fact that there are four high speed channels to be calibrated in the self calibrating HDMI cable 502. After arbitrarily selecting a first Channel Circuit 602 as the Test Channel 608 in the step 902 "Select 1st Test Channel", a different Channel Circuit 602 is selected as the Sampling Channel 606 in the step 904 "Select a Sampling Channel". In the next step 906 "Calibrate the selected Test Channel" the Test Channel 608 is calibrated. As long as this is not the last Test Channel ("NO" from the next step 908 "last Test Channel?"), the next Test Channel is selected in the step 910 "Select next Test Channel". The steps 904 to 910 are repeated until all Channel Circuits 602 have been calibrated ("YES" from the step 908 "last Test Channel?").

Figure 13:
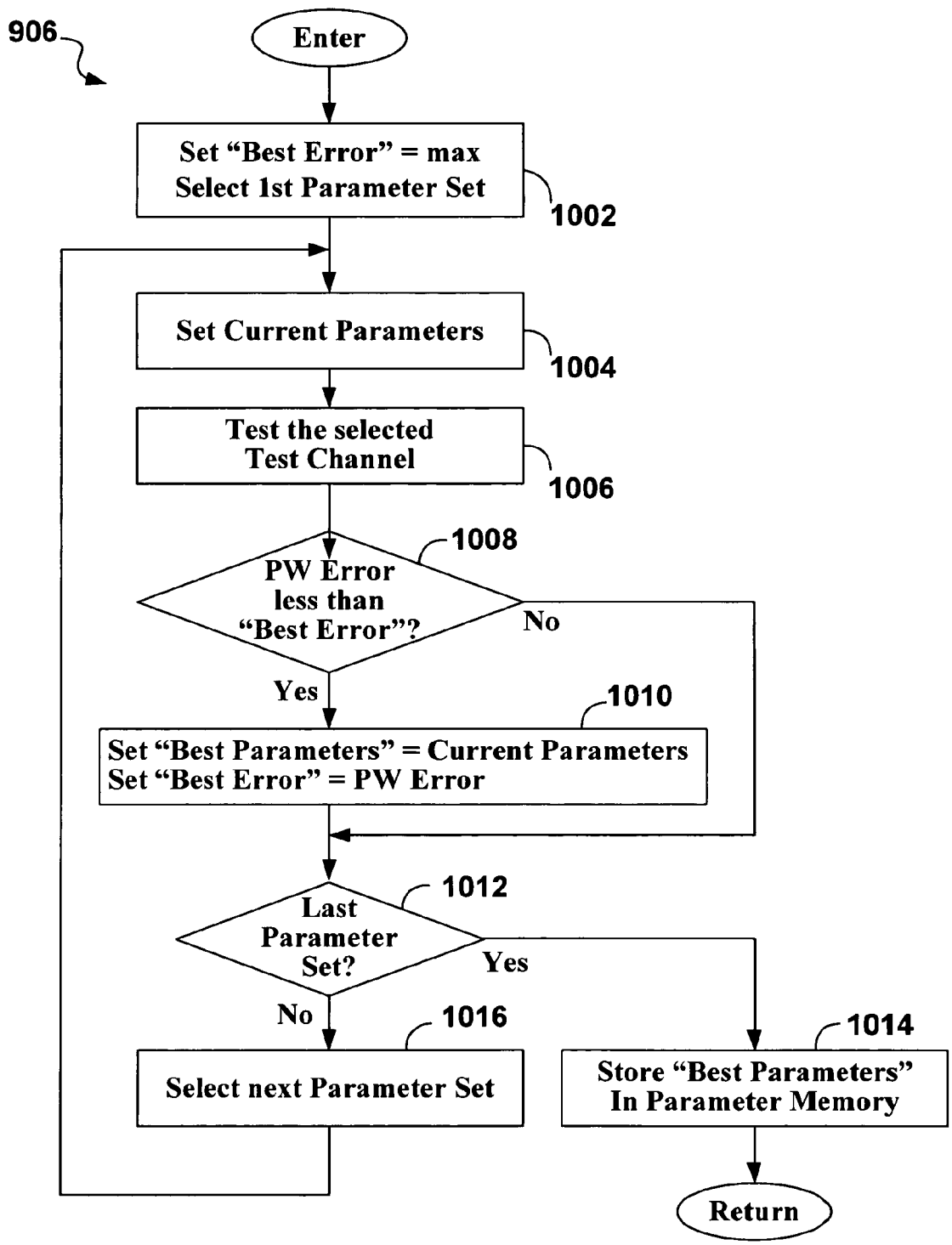
FIG. 13 shows an expansion of the step 906: "Calibrate the selected Test Channel" of FIG. 12.

FIG. 13 shows an expansion of the step 906: "Calibrate the selected Test Channel" of FIG. 12, including steps:
1002: "Set Best Error=max, and select first Parameter Set";
1004: "Set Current Parameters";
1006: "Test the selected Test Channel";
1008: Determine if "PW Error less than Best Error";
1010: "Set Best Parameters=Current Parameters, and Set Best Error=PW Error";
1012: Determine if this is the "Last Parameter Set?";
1014: "Store Best Parameters in Parameter Memory"; and
1016: "Select next Parameter Set".

The calibration of one channel (the selected Test Channel) is focused on reducing a Pulse Width (PW) Error to a minimum by setting parameters of the Programmable Boost Circuit 612. The PW Error is defined as the absolute difference between the known pulse width of a transmitted bit (the transmitted single "1" bit 814), and the pulse width of the received single "1" bit 816.

In initializing the calibration of one channel (the selected Test Channel) in the step 1002 "Set Best Error=max, and select first Parameter Set", a "Best Error" is defined and set at to high value, and a first set of parameters, of the Programmable Boost Circuit 612 is selected as the current parameters.

In the step 1006 "Test the selected Test Channel" the selected Test Channel is tested, that is the pulse width error of the received single "1" bit 816 is determined. The pulse width error is indicative of the performance of the Programmable Boost Circuit 612 in terms of equalization or compensation of other cable impairments. If it is found that the PW Error is less than the previously established Best Error, ("YES from the step 1008 "PW Error less than Best Error"), the current parameters are recorded as the "Best Parameters" and the PW Error is recorded as the Best Error in the step 1010 "Set Best Parameters=Current Parameters, and Set Best Error=PW Error", other wise the step 1010 is skipped. If it is determined that all parameter sets have been used (YES from the step 1012 "Last Parameter Set?") the best parameter set is permanently stored in the parameter memory in the step 1014 "Store Best Parameters in Parameter Memory" completing the calibration of this channel, otherwise ("NO" from the step 1012) the next parameter set is selected in the step 1016 "Select next Parameter Set", and the channel is tested with the new current parameters beginning with the step 1004 above. The step 1014 "Store Best Parameters in Parameter Memory" is preferably carried out by the Calibration Control 514 (FIGS. 7 and 8) of the Calibration Fixture 504 which accesses the Parameter Memory 700 through the link 516 and the I²C interface 630 (FIGS. 8 and 9).

It is noted that in the first embodiment, the step 906 is entirely performed in the SC Boost Device 512 while in the second and third embodiments, the calibration of the selected test channels (the steps 1002 to 1012, and 1016) is performed in the Selected Boost Device 534 while the step 1014 "Store Best Parameters in Parameter Memory" includes storing the best parameters in the Parameter Memory 700 of the SC Boost Device 512.

Figure 14:
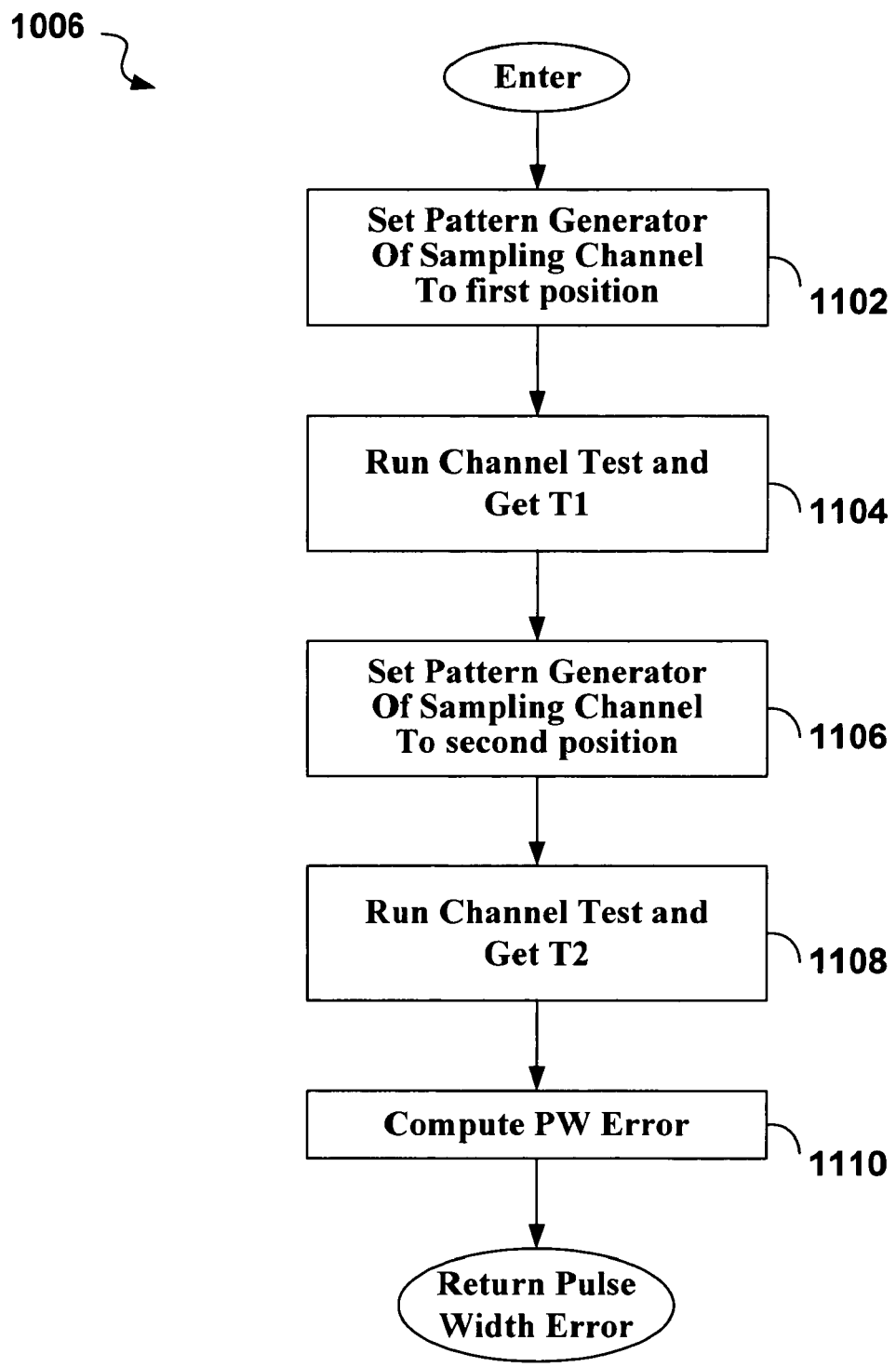
FIG. 14 shows an expansion of the step 1006: "Test the selected Test Channel" of FIG. 13.

FIG. 14 shows an expansion of the step 1006: "Test the selected Test Channel" of FIG. 13, including steps:
1102: "Set Pattern Generator of Sampling Channel to first position";
1104: "Run Channel Test and Get T1";
1106: "Set Pattern Generator of Sampling Channel to second position";
1108: "Run Channel Test and Get T2"; and
1110: "Compute PW Error".

Testing the selected Test Channel 608, is equivalent to obtaining the pulse width (PW) error with the currently set parameters. In the first step 1102 "Set Pattern Generator of Sampling Channel to first position" the pattern generator 614 of the sampling channel 606 (FIG. 8A) is programmed such that the sampling (positive going) edge of the transmitted sampling pattern 804 occurs before the rising edge of the transmitted single "1" bit 814. This is the position shown in FIG. 10, which allows the delayed sampling clocks 810 to cover the rising edge of the received single "1" bit 816 (at T1).

In the next step 1104 "Run Channel Test and Get T1" the channel is tested (FIG. 15 below) to obtain an estimate of the relative time T1 of the rising edge of the received single "1" bit 816.

In the step 1106 "Set Pattern Generator of Sampling Channel to second position" the pattern generator 614 of the sampling channel 606 (FIG. 8A) is programmed such that the sampling (positive going) edge of the transmitted sampling pattern 804 occurs before the falling edge of the transmitted single "1" bit 814. This position allows the delayed sampling clocks 810 to cover the falling edge of the received single "1" bit 816 (at T1). The step 1106 may not be required if the range of the Programmable Delay 710 is sufficient to cover both edges T1 and T2.

In the next step 1104 "Run Channel Test and Get T2" a the channel is tested again, this time to obtain an estimate of the relative time T2 of the falling edge of the received single "1" bit 816. The pulse width error may then be simply computed by subtracting the difference between T1 and T2 from the known transmitted pulse width (TPW) of the transmitted single "1" bit 814 in the step 1110 "Compute PW Error": PW Error=absolute value of (TPW−((T2−T1)).

Figure 15:
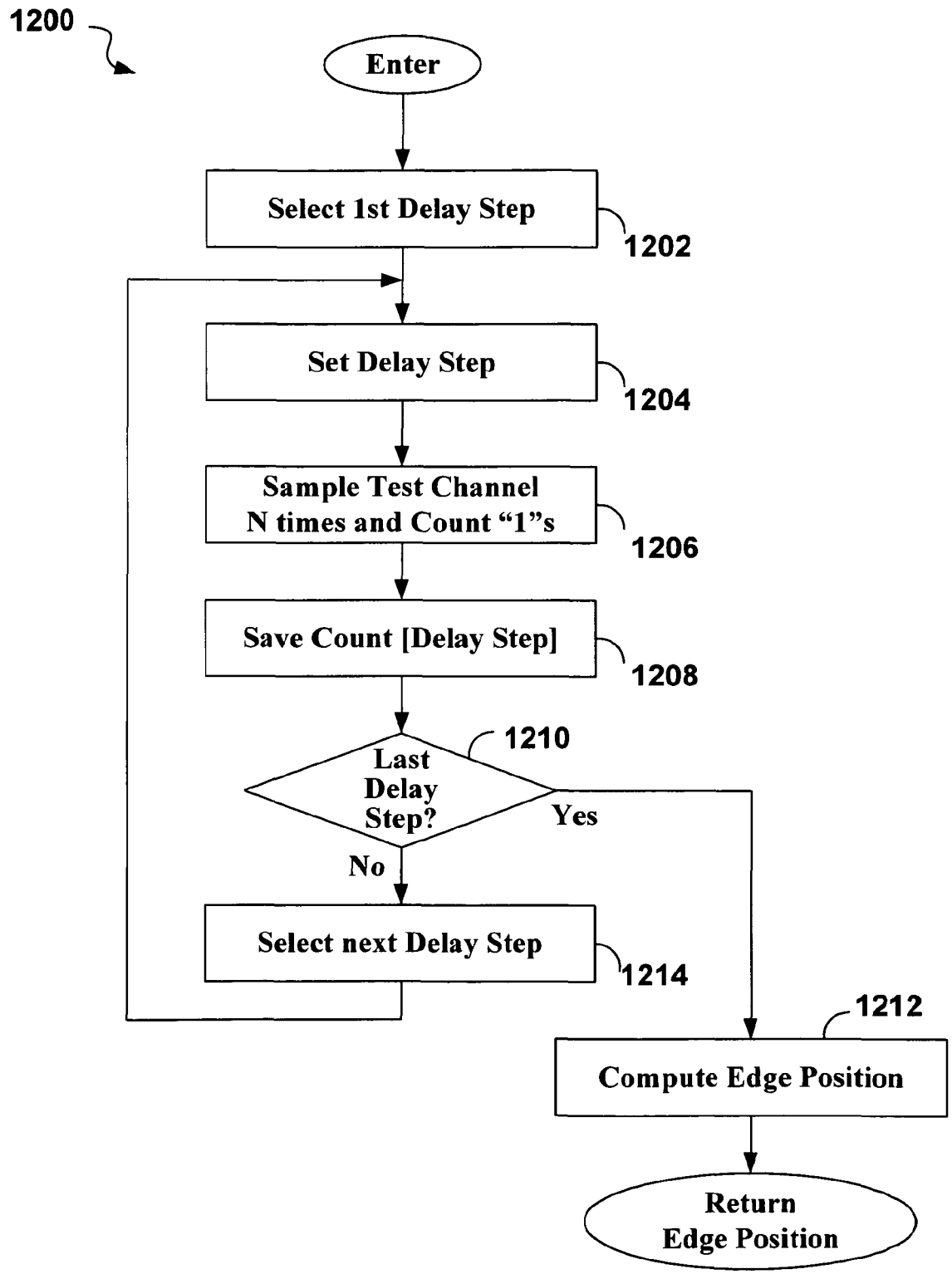
FIG. 15 shows a flowchart of a Channel Test 1200 which is an expansion of each of the steps 1104 "Run Channel Test and Get T1" and 1108 "Run Channel Test and Get T2" of FIG. 14.

FIG. 15 shows a flowchart of a Channel Test 1200 which is an expansion of each of the steps 1104 "Run Channel Test and Get T1" and 1108 "Run Channel Test and Get T2" of FIG. 14, including steps:
1202: "Select first Delay Step";
1204: "Set Delay Step";
1206: "Sample Test Channel N times and Count 1s";
1208: "Save Count [Delay Step]";
1210: determine if the current Delay Step is the "Last Delay Step?";
1212: "Compute Edge Position"; and
1214: "Select next delay Step".

In the Channel Test 1200, the position of an edge of the received single "1" bit 816 is determined as follows:
the Delay Step Counter 702 (FIG. 9) is initialized to a first delay step in the step 1202 "Select first Delay Step";
the delay of the Programmable Delay 710 is set by the Delay Step Counter 702 in the step 1204 "Set Delay Step";

in the step 1206 "Sample Test Channel N times and Count 1s", the received test pattern 806 is sampled with the delayed sampling pulse 714 of the Programmable Delay 710, in the sampling flip flop 718. A plurality of N samples are obtained in N consecutive cycles of the test pattern (the pattern length is counted off in the Pattern Length Counter 708), and for each of the N cycles the Ones-Counter 720 is incremented if the sample is a logic "1";

after N samples have been collected as determined in the N-Counter 704, the count of "1"s that has been accumulated in the Ones-Counter 720, is stored in the Memory 706 at an address indexed by the delay step, in the step 1208 "Save Count [Delay Step]";

if it is determined next that all delay steps have been applied ("YES" from the step 1210 "Last Delay Step?") the edge position is computed from the "1"s counts that was obtained with each delay step and are located in the Memory 706. Otherwise ("NO" from the step 1210 "Last Delay Step?"), the next delay step is selected by incrementing the Delay Step Counter 702 in the step 1214 "Select next delay Step".

The computation of the edge position is preferably carried out by the Calibration Control 514 (FIGS. 7 and 8) of the Calibration Fixture 504 which accesses the Memory 706 through the link 516 and the I²C interface 630 (FIGS. 8 and 9).

The description of the calibration steps of FIGS. 10 to 15 is applicable to all three embodiments with the proviso that the circuitry for the test pattern generation and the sampling of the received bit stream is located: in the SC Boost Device 512 in the first embodiment; in the Selected Boost Device 532 in the second embodiment; and split between the RX Boost Device 554 and the TX Chip 556 in the third embodiment as described in detail earlier.

The embodiments of the present invention have the following advantages. The embodiments of the present invention provide a self calibrating method for boosted HDMI cables without the need for external high speed test equipment as the test pattern generation and detection is built into the boost device or a replica of the boost device in a test fixture, while a simple control circuit, implemented in a micro controller or an FPGA is sufficient to direct the calibration process over the relatively low-speed I²C bus that is part of the HDMI specification. Thus, significant economies are gained.

Although the embodiment of the invention has been described with regard to a boosted HDMI cable, boosted high speed cables according to other standards may equally benefit from the present invention.

Although the embodiments of the invention have been described in detail, it will be apparent to one skilled in the art that variations and modifications to these embodiments may be made within the scope of the following claims.

What is claimed is:

1. A system for calibrating a high speed cable carrying a plurality of high speed channels, the cable having a low speed control bus, an input connector, an output connector, and an embedded boost device having programmable parameters for boosting the high speed channels, the system comprising:
 a calibration fixture propagating the high speed channels therethrough, which have been looped from the output connector to the input connector outside of the cable, the calibration fixture including:
  (a) a plurality of programmable boost circuits coupled to the output connector for receiving boosted high speed channels from the cable;
  (b) a corresponding plurality of transmit circuits for transmitting a test signal to the high speed channels at the input connector for propagating through the cable to the output connector; and
  (c) a calibration control device, operably connected to the low speed control bus, for calibrating the cable by controlling the transmit circuits, monitoring the programmable boost circuits, and setting the programmable parameters of the embedded boost device.

2. The system of claim 1, wherein the calibration fixture comprises a selected boost device, said selected boost device containing said pluralities of programmable boost circuits and of transmit circuits.

3. The system of claim 2, wherein the selected boost device comprises a pattern generator interfacing the low speed control bus, for generating the test signal.

4. The system of claim 3, wherein the selected boost device further comprises:
 a sampling circuit for sampling outputs of the programmable boost circuits; and
 a sampling control circuit for monitoring the sampling circuit and for sending sampling results to the calibration control device.

5. The system of claim 2, wherein the selected boost device is a boost device having been selected from manufactured boot devices and screened for high accuracy of its sampling circuit.

6. The system of claim 5, wherein the sampling circuit comprises:
 a programmable delay for delaying an output of a first selected one of the programmable boost circuits;
 a sampling circuit element for generating samples from an output of a second selected one of the programmable boost circuits clocked with the delayed output of the first selected one, wherein the samples have values of "0" and "1"; and
 a means for determining an average of the values of N generated samples.

7. The system of claim 6, wherein said sampling circuit element comprises a flip flop.

8. The system of claim 6, wherein said means for determining the average comprises a counter for counting instances of the generated samples having the same value.

9. The system of claim 6, wherein the sampling control circuit comprises:
 a delay step counter for varying the a programmable delay in predetermined delay steps;
 a memory for storing the average of N generated samples for each delay step;
 a divide-by-N counter for incrementing the delay step counter to the next step after N samples have been collected.

10. The system of claim 9, wherein the calibration control device comprises means for interpolating between the predetermined delay steps by using the averages stored in said memory.

11. The system of claim 1, wherein the calibration fixture further comprises a transmit chip comprising the plurality of transmit circuits.

12. The system of claim 11, wherein the transmit chip comprises a pattern generator interfacing the low speed control bus, for generating the test signal.

13. The system of claim 1, wherein the calibration fixture comprises a direct feed-through connection from the output connector to the input connector of the cable.

14. A method for calibrating a high speed cable having an embedded boost device, the cable carrying a plurality of high speed channels from an input connector to an output connector, and a low speed control bus, the method comprising:

(a) propagating the high speed channels from the output connector to the input connector through a calibration fixture outside of the cable;
(b) selecting a test channel from among the high speed channels;
(c) selecting a sampling channel from among the remaining high speed channels;
(d) calibrating the test channel with the sampling channel; and
(e) repeating the steps (b) to (d) until all high speed channels are calibrated.

15. The method of claim 14, wherein the step (d) comprises:
(f) selecting and setting a parameter set of the embedded boost device;
(g) testing the test channel with the selected parameter set to obtain a measure that is indicative of the performance of the embedded boost device;
(h) selecting a different parameter set; and
(i) repeating the steps (g) and (h) until a required measure is obtained.

16. The method of claim 15, wherein the measure is a pulse width error, and the required measure is a minimized pulse width error.

17. The method of claim 15, wherein the step (a) comprises propagating the high speed channels through a direct feed-through connection by providing in the calibration fixture a galvanic connection from the output connector to the input connector of the cable.

18. The method of claim 17, wherein the step (g) comprises:
(j) sending a repetitive test pattern over the test channel; and
(k) sending a repetitive sampling pattern synchronized with the repetitive test pattern over the sampling channel.

19. The method of claim 18, wherein the step (g) further comprises:
(l) receiving a received test pattern and a received sampling pattern through the looped cable from the test channel and the sampling channel respectively; and
(m) sampling the received test pattern with the received sampling pattern to obtain relative times of rising and falling edges of a received pulse of the received test pattern.

20. The method of claim 19, wherein the step (g) further comprises:
(n) computing a pulse width of the received pulse from the difference of the relative times; and
(o) computing a pulse width error by comparing a pulse width of a transmitted pulse of the repetitive test pattern and the pulse width of the received pulse.

21. The method of claim 19, wherein the step (m) comprises:
(p) delaying the received sampling pattern by a programmable delay value to obtain a delayed sampling pulse;
(q) sampling the received test pattern with the delayed sampling pulse N times to yield "0" and "1" samples;
(r) counting the samples, which have the same value, to produce a count;
(s) saving the count and the delay value in a memory;
(t) repeating the steps (p) to (s) for different delay values;
(u) computing the relative times of rising and falling edges from the saved delay values and the saved counts.

22. The method of claim 21, wherein N is greater than 8.

23. The method of claim 15, wherein the step (a) comprises
(a1) receiving a boosted signal of the high speed channels from the output connector in another boost device; and
(a2) transmitting a test signal of the high speed channels to the input connector from the another boost device.

24. The method of claim 23, wherein the step (g) comprises:
(j1) sending a repetitive test pattern from the another boost device over the test channel; and
(k1) sending a repetitive sampling pattern synchronized with the repetitive test pattern from the another boost device over the sampling channel.

25. The method of claim 24, wherein the step (g) further comprises:
(l1) receiving in the boost device a received test pattern and a received sampling pattern through the looped cable from the test channel and the sampling channel respectively;
(l2) boosting the received test pattern and the received sampling pattern in the embedded boost device and forwarding a boosted test pattern and a boosted sampling pattern to the another boost device; and
(m1) sampling the boosted test pattern in the another boost device with the boosted sampling pattern to obtain relative times of rising and falling edges of a boosted pulse of the boosted test pattern.

26. The method of claim 25, wherein the step (g) further comprises:
(n1) computing a pulse width of the boosted pulse from the difference of the relative times; and
(o1) computing a pulse width error by comparing a pulse width of a transmitted pulse of the repetitive test pattern and the pulse width of the boosted pulse.

27. The method of claim 25, wherein the step (m1) comprises:
(p1) delaying the boosted sampling pattern by a programmable delay value to obtain a delayed sampling pulse;
(q1) sampling the boosted test pattern with the delayed sampling pulse N times to yield "0" and "1" samples;
(r1) counting the samples, which have the same value, to produce a count;
(s1) saving the count and the delay value in a memory;
(t1) repeating the steps (p) to (s) for different delay values;
(u1) computing the relative times of rising and falling edges from the saved delay values and the saved counts.

28. The method of claim 27, wherein N is greater than 8.

29. The method of claim 15, wherein the step (a) comprises
(a3) receiving a boosted signal of the high speed channels from the output connector in another boost device; and
(a4) transmitting a test signal of the high speed channels to the input connector from a transmit chip.

30. The method of claim 29, wherein the step (g) comprises:
(j2) sending a repetitive test pattern from the transmit chip over the test channel; and
(k2) sending a repetitive sampling pattern synchronized with the repetitive test pattern from the transmit chip over the sampling channel.

31. The method of claim 30, wherein the step (g) further comprises:
(l3) receiving in the embedded boost device a received test pattern and a received sampling pattern through the looped cable from the test channel and the sampling channel respectively;
(l4) boosting the received test pattern and the received sampling pattern in the embedded boost device and forwarding a boosted test pattern and a boosted sampling pattern to the another boost device; and (m2) sampling the boosted test pattern in the another boost device with the boosted sampling pattern to obtain relative times of rising and falling edges of a boosted pulse of the boosted test pattern.

32. The method of claim 31, wherein the step (g) further comprises:
(n2) computing a pulse width of the boosted pulse from the difference of the relative times; and
(o2) computing a pulse width error by comparing a pulse width of a transmitted pulse of the repetitive test pattern and the pulse width of the boosted pulse.

33. The method of claim 31, wherein the step (m2) comprises:
(p2) delaying the boosted sampling pattern by a programmable delay value to obtain a delayed sampling pulse;
(q2) sampling the boosted test pattern with the delayed sampling pulse N times to yield "0" and "1" samples;
(r2) counting the samples, which have the same value, to produce a count;
(s2) saving the count and the delay value in a memory;
(t2) repeating the steps (p) to (s) for different delay values;
(u2) computing the relative times of rising and falling edges from the saved delay values and the saved counts.

34. The method of claim 33, wherein N is greater than 8.

35. The method of claim 14, wherein the step (a) further comprises providing one of the boosted high speed channels as a sampling clock.

* * * * *